US008724618B2

(12) United States Patent
Hara et al.

(10) Patent No.: US 8,724,618 B2
(45) Date of Patent: May 13, 2014

(54) SYSTEM FOR CONNECTING INFORMATION PROCESSING DEVICES ASSOCIATED WITH IP TELEPHONES

(75) Inventors: Yasushi Hara, Kawasaki (JP); Akira Shiba, Kawasaki (JP); Youichi Kondou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 2112 days.

(21) Appl. No.: 11/504,640

(22) Filed: Aug. 16, 2006

(65) Prior Publication Data

US 2007/0263613 A1    Nov. 15, 2007

(30) Foreign Application Priority Data

Apr. 20, 2006  (JP) .................................. 2006-116551
Jul. 27, 2006  (JP) .................................. 2006-204566

(51) Int. Cl.
*H04L 12/66*  (2006.01)

(52) U.S. Cl.
USPC ........................................................ 370/352

(58) Field of Classification Search
USPC .............. 370/352, 356, 465; 455/417, 426.2; 709/219; 713/185
See application file for complete search history.

(56) References Cited

U.S. PATENT DOCUMENTS

| 5,742,670 | A | 4/1998 | Bennett |
| 7,526,252 | B2 | 4/2009 | Rekimoto et al. |
| 2004/0235504 | A1 | 11/2004 | Kohno et al. |
| 2005/0114646 | A1 | 5/2005 | Rekimoto et al. |
| 2005/0122903 | A1* | 6/2005 | Hultgren et al. ............. 370/230 |
| 2005/0207551 | A1 | 9/2005 | Nagashima |
| 2006/0094411 | A1* | 5/2006 | Dupont .......................... 455/417 |
| 2006/0121916 | A1* | 6/2006 | Aborn et al. ............... 455/456.5 |

FOREIGN PATENT DOCUMENTS

| JP | 8-321889 | 12/1996 |
| JP | 2003-69602 | 3/2003 |
| JP | 2003-283670 | 10/2003 |

(Continued)

OTHER PUBLICATIONS

Office Action, mailed Dec. 7, 2010, in corresponding Japanese Application 2006-204566 (2 pp.).

*Primary Examiner* — Asad Nawaz
*Assistant Examiner* — Stephanie Chang
(74) *Attorney, Agent, or Firm* — Staas & Halsey LLP

(57) ABSTRACT

An information processing apparatus for call control and management stores a first telephone identification and a first IP address of a first IP telephone, a first device identification and a second IP address of a first information processing device associated with the first IP telephone by a first association identification, a second telephone identification and a third IP address of the second IP telephone, and a second device identification and a fourth IP address of a second information processing device associated with the second IP telephone. In response to a message requesting for establishing a session received from the first IP telephone or the first information processing device, the information processing apparatus sends a message requesting for establishing a session between the first IP telephone and the second IP telephone, by using the first IP address of the first IP telephone and the third IP address of the second IP telephone in accordance with the registration information, to thereby establish a session between the first IP telephone and the second IP telephone, and also notifies the IP address of one of the first and second information processing devices to the other information processing device, in accordance with the registration information, to thereby establish a session between the first information processing device and the second information processing device.

20 Claims, 23 Drawing Sheets

(56) References Cited

FOREIGN PATENT DOCUMENTS

| | | |
|---|---|---|
| JP | 2004-104653 | 4/2004 |
| JP | 2004-282248 | 10/2004 |
| JP | 2005-268954 | 9/2005 |
| JP | 2005-323172 | 11/2005 |

* cited by examiner

| ENTRY | TELEPHONE REGISTERED NAME | USER NAME | TELEPHONE IP ADDRESS | SESSION STATUS | TAG ID | PROX-IMITY FLAG | DEVICE REGISTERED NAME | USER NAME | DEVICE IP ADDRESS | SESSION STATUS |
|---|---|---|---|---|---|---|---|---|---|---|
| 001 | IP-Phn1 | A | 10.10.10.1 | RELEASED | XXX...YYY... | 1 | WSpc | A | 10.10.20.2 | RELEASED |
| 002 | IP-Phn1 | A | 10.10.10.1 | RELEASED | XXX...YYY... | 0 | Npc70 | A | 10.10.20.3 | RELEASED |
| 003 | IP-Phn1 | A | 10.10.10.1 | RELEASED | XXX...YYY... | 0 | Ppc | A | 10.10.20.4 | RELEASED |
| 004 | | | | | | | | | | |
| 005 | | | | | | | | | | |
| 006 | IP-Phn2 | B | 10.10.10.2 | RELEASED | XXX...YYY... | 1 | Dpc1 | B | 10.10.20.5 | RELEASED |
| 007 | IP-Phn3 | C | 10.10.10.3 | RELEASED | XXX...YYY... | 0 | NpcLX | C | 10.10.20.6 | RELEASED |
| 008 | IP-Phn4 | D | 10.10.10.4 | RELEASED | XXX...YYY... | 0 | Npc50 | D | 10.10.20.7 | RELEASED |
| 009 | IP-Phn5 | E | 10.10.10.5 | ESTABLISHED IP-Phn7 | XXX...YYY... | 0 | NpcNB | E | 10.10.20.8 | ESTABLISHED Dpc6 |
| 010 | IP-Phn6 | F | 10.10.10.6 | RELEASED | XXX...YYY... | 1 | Dpc5 | F | 10.10.20.9 | RELEASED |
| 011 | IP-Phn7 | G | 10.10.10.7 | ESTABLISHED IP-Phn5 | XXX...YYY... | 1 | Dpc6 | G | 10.10.20.10 | ESTABLISHED NpcNB |

FIG. 10

| ENTRY | TELEPHONE REGISTERED NAME | USER NAME | TELEPHONE IP ADDRESS | SESSION STATUS | TAG ID | PROX- IMITY FLAG | DEVICE REGISTERED NAME | USER NAME | DEVICE IP ADDRESS | SESSION STATUS |
|---|---|---|---|---|---|---|---|---|---|---|
| 001 | IP-Phn1 | A | 10.10.10.1 | RELEASED | XXX... YYY... | 0 | WSpc | A | 10.10.20.2 | RELEASED |
| 002 | IP-Phn1 | A | 10.10.10.1 | ESTABLISHED | XXX... YYY... | 1 | Npc70 | A | 10.10.20.3 | RELEASED |
| 003 | IP-Phn1 | A | 10.10.10.1 | RELEASED | XXX... YYY... | 0 | Ppc | A | 10.10.20.4 | RELEASED |
| 004 | IP-Phn1 | A | 10.10.10.1 | RELEASED | XXX... YYY... | 1 | NpcLX | C | 10.10.20.6 | RELEASED |
| 005 | IP-Phn1 | A | 10.10.10.1 | RELEASED | XXX... YYY... | 1 | Npc50 | D | 10.10.20.7 | RELEASED |
| 006 | IP-Phn2 | B | 10.10.10.2 | RELEASED | XXX... YYY... | 1 | Dpc1 | B | 10.10.20.5 | RELEASED |
| 007 | IP-Phn3 | C | 10.10.10.3 | RELEASED | XXX... YYY... | 0 | NpcLX | C | 10.10.20.6 | RELEASED |
| 008 | IP-Phn4 | D | 10.10.10.4 | RELEASED | XXX... YYY... | 0 | Npc50 | D | 10.10.20.7 | RELEASED |
| 009 | IP-Phn5 | E | 10.10.10.5 | ESTABLISHED IP-Phn7 | XXX... YYY... | 0 | NpcNB | E | 10.10.20.8 | ESTABLISHED Dpc6 |
| 010 | IP-Phn6 | F | 10.10.10.6 | RELEASED | XXX... YYY... | 1 | Dpc5 | F | 10.10.20.9 | RELEASED |
| 011 | IP-Phn7 | G | 10.10.10.7 | ESTABLISHED IP-Phn5 | XXX... YYY... | 1 | Dpc6 | G | 10.10.20.10 | ESTABLISHED NpcNB |

| TELEPHONE STATUS | | |
|---|---|---|
| REGISTERED NAME | USER NAME | SESSION |
| IP-Phn1 | A | RELEASED |
| OTHER REG. NAMES | USER NAMES | SESSION |
| IP-Phn2 | B | RELEASED |
| IP-Phn3 | C | RELEASED |
| IP-Phn4 | D | RELEASED |
| IP-Phn5 | E | ESTABLISHED |
| IP-Phn6 | F | RELEASED |
| IP-Phn7 | G | ESTABLISHED |

FIG. 17B

| TELEPHONE STATUS | | |
|---|---|---|
| REGISTERED NAME | USER NAME | SESSION |
| IP-Phn1 | A | RELEASED |
| OTHER REG. NAMES | USER NAMES | SESSION |
| IP-Phn2 | B | RELEASED |
| IP-Phn3 | CALL | RELEASED |
| IP-Phn4 | DATA SHARING 1 | RELEASED |
| IP-Phn5 | CALL & DATA SHAR. 1 | ESTABLISHED |
| IP-Phn6 | CALL & DATA SHAR. 2 | RELEASED |
| IP-Phn7 | VIEW REG. DEVICES | ESTABLISHED |

| STATUS OF REGISTERED DEVICE OF USER B | | |
|---|---|---|
| PROX. | REGISTERED NAME | USER NAME | SESSION |
| 1 | Dpc1 | B | RELEASED |
| STATUSES OF OTHER PROXIMATE DEVICES | | | |
| PROX. | REGISTERED NAMES | USER NAMES | SESSION |
| 1 | Dpc5 | DATA SHARING 1 | RELEASED |
| 1 | Dpc6 | CALL & DATA SHAR. 1 | RELEASED |
|  |  | CALL & DATA SHAR. 2 |  |

| STATUS OF REGISTERED DEVICE OF USER B | | |
|---|---|---|
| PROX. | REGISTERED NAME | USER NAME | SESSION |
| 1 | Dpc1 | B | ESTABLISHED |
| STATUSES OF OTHER PROXIMATE DEVICES | | | |
| PROX. | REGISTERED NAMES | USER NAMES | SESSION |
| 1 | Dpc5 | F | RELEASED |
| 1 | Dpc6 | G | RELEASED |

FIG. 18A

| TELEPHONE STATUS | | |
|---|---|---|
| REGISTERED NAME | USER NAME | SESSION |
| IP-Phn2 | B | RELEASED |
| OTHER REG. NAMES | USER NAMES | SESSION |
| IP-Phn1 | A | RELEASED |
| IP-Phn3 | C | RELEASED |
| IP-Phn4 | D | RELEASED |
| IP-Phn5 | E | ESTABLISHED |
| IP-Phn6 | F | RELEASED |
| IP-Phn7 | G | ESTABLISHED |

FIG. 18B

| TELEPHONE STATUS | | |
|---|---|---|
| REGISTERED NAME | USER NAME | SESSION |
| IP-Phn2 | B | RELEASED |
| OTHER REG. NAMES | USER NAMES | SESSION |
| IP-Phn1 | A | RELEASED |
| IP-Phn3 | CALL | RELEASED |
| IP-Phn4 | DATA SHARING 1 | RELEASED |
| IP-Phn5 | CALL & DATA SHAR. 1 | ESTABLISHED |
| IP-Phn6 | CALL & DATA SHAR. 2 | RELEASED |
| IP-Phn7 | VIEW REG. DEVICES | ESTABLISHED |

 M5

FIG. 18C

| STATUSES OF REGISTERED DEVICES OF USER A | | | |
|---|---|---|---|
| PROX. | REGISTERED NAMES | USER NAMES | SESSION |
| 0 | WSpc | A | RELEASED |
| 1 | Npc70 | A | RELEASED |
| 0 | Ppc | A | RELEASED |
| STATUSES OF OTHER PROXIMATE DEVICES | | | |
| PROX. | REGISTERED NAMES | USER NAMES | SESSION |
| 1 | NpcLX | C | RELEASED |
| 1 | Npc50 | D | RELEASED |

FIG. 19A

| TELEPHONE STATUS | | |
|---|---|---|
| REGISTERED NAME | USER NAME | SESSION |
| IP-Phn2 | B | RELEASED |
| OTHER REG. NAMES | USER NAMES | SESSION |
| IP-Phn1 | A | RELEASED |
| IP-Phn3 | C | RELEASED |
| IP-Phn4 | D | RELEASED |
| IP-Phn5 | E | ESTABLISHED |
| IP-Phn6 | F | RELEASED |
| IP-Phn7 | G | ESTABLISHED |

FIG. 19B

| TELEPHONE STATUS | | |
|---|---|---|
| REGISTERED NAME | USER NAME | SESSION |
| IP-Phn2 | B | RELEASED |
| OTHER REG. NAMES | USER NAMES | SESSION |
| IP-Phn1 | A | RELEASED |
| IP-Phn3 | CALL | RELEASED |
| IP-Phn4 | DATA SHARING 1 | RELEASED |
| IP-Phn5 | CALL & DATA SHAR. 1 | ESTABLISHED |
| IP-Phn6 | CALL & DATA SHAR. 2 | RELEASED |
| IP-Phn7 | VIEW REG. DEVICES | ESTABLISHED |

| STATUSES OF REGISTERED DEVICES OF USER A | | | |
|---|---|---|---|
| PROX | REGISTERED NAMES | USER NAMES | SESSION |
| 0 | WSpc | A | RELEASED |
| 1 | Npc70 | A | ESTABLISHED |
| 0 | Ppc | A | RELEASED |
| STATUSES OF OTHER PROXIMATE DEVICES | | | |
| PROX. | REGISTERED NAMES | USER NAMES | SESSION |
| 1 | NpcLX | C | ESTABLISHED |
| 1 | Npc50 | D | ESTABLISHED |

SYSTEM FOR CONNECTING INFORMATION PROCESSING DEVICES ASSOCIATED WITH IP TELEPHONES

FIELD OF THE INVENTION

The present invention relates generally to connection of IP telephones over an IP network using contactless information storage device, and more particularly to such a system for allowing an IP mobile telephone and an information processing device associated with it by an RF ID tag to establish a session between such IP telephones over an IP network and also establishing a P2P (peer-to-peer) session between such information processing devices over the IP network via a call control and management server.

BACKGOUND OF THE INVENTION

The known VoIP (Voice over IP) communication technology allows IP (Internet Protocol) telephone communications between two IP telephones over the Internet.

Japan Patent Application Publication JP 2003-69602-A describes an IP telephone system. In this system, an IP telephone client A sends a call origination control packet containing an IP telephone address of an IP telephone client B. Upon receipt of this packet, an IP telephone server A performs a procedure for causing an unfixed IP address of the client A to be held until the end of the IP telephone communication, and sends the packet to an IP telephone server B on the side of the client B. Upon receipt of this packet, the server B performs a procedure for causing an unfixed IP address of the client B to be held until the end of the IP telephone communication, and sends the packet to the client B. Upon receipt of this packet, the client B notifies a user of reception of the incoming call in a predetermined manner. If an instruction is provided by the user for responding to the incoming call, the client B sends, to the client A, a response packet for responding to the call origination control packet.

Japan Patent Application Publication JP 2003-283670-A describes a VoIP contact center system which integrates an audio system and a data system. In this VoIP contact center system, an audio service apparatus and a data service apparatus are connected to a switching system installed only in a main center, and received audio is converted into the IP format for integration with data to provide the integrated data to a satellite center and a residential satellite center, to thereby provide a service for allowing a customer to listen to audio explanation while the customer and an operator watch the same Web page.

U.S. Patent Application Publication US 2004/235504-A1 (which corresponds to Japan Patent Application Publication JP 2004-282248-A) describes an information processing system, which includes measures to address issues regarding the access control and/or session control, capable of transmitting and receiving a control packet from a remote apparatus that is placed on a network in a location where another party resides, with which voice dialog communications is being taken place. In this information processing system, two personal digital assistants (PDAs) are respectively connected by radio communications to two connection points, called access points, to perform voice communication over a VoIP network. In addition, the two personal digital assistants connect themselves to two respective personal computers using RF ID, and then exchange packets of data with the two respective personal computers via local radio communication units and the Internet.

U.S. Patent Application Publication US 2005/207551-A1 (which corresponds to Japan Patent Application Publication JP 2005-268954-A) describes a CTI system, which comprises a telephone terminal having an ID tag, a server-connected main unit for controlling the telephone terminal, and an information processing terminal having an ID reader and a communication unit. By positioning the ID reader of the information processing terminal and the ID tag of the telephone terminal in close proximity to each other, the ID reader reads ID information of the ID tag in a non-contact manner. The information processing terminal sends the ID information read by the ID reader to the main unit by the use of the communication unit. The main unit associates the information processing terminal with the telephone terminal with reference to the ID information. The main unit is responsive to a request of the information processing terminal and performs call control for the telephone terminal associated with the information processing terminal.

Japan Patent Application Publication JP 2005-323172-A describes a network system using an RF ID tag. The network system includes a personal computer having an RF ID tag reader which obtains positional information of a user by an RF communication with an RF ID tag, and includes a location server for managing the positional information and the address of an available apparatus in association with it. The network system further includes an ENUM-DNS for identifying an apparatus associated with the user using an ENUM function. The personal computer communicates with the identified apparatus. Thereby, the use of the ENUM allows positional information on the receiving side to be accurately determined without repairing the server, so that communication can be established based on the positional information.

An IP telephone performs call control via a call control and management server on the network. For the call control, SIP (Session Initiation Protocol), H.323 or the like is used as a communication protocol. For initiating a call, the IP telephone typically establishes a session with another IP telephone via the call control and management server having a SIP server function. After the session is established, the IP telephone performs P2P (peer-to-peer) audio packet exchange with the other IP telephone.

SUMMARY OF THE INVENTION

In accordance with an aspect of the present invention, a system comprises an information processing apparatus for call control and management, a first IP telephone having a contactless information storage device and/or a contactless reader/writer device, a first information processing device having a contactless reader/writer device and/or a contactless information storage device, a second IP telephone and a second information processing device, which are adapted to be connected to an IP network. The call control and management information processing apparatus stores, as registration information, a first telephone identification and a first IP address of the first IP telephone, a first device identification and a second IP address of the first information processing device associated with the first IP telephone by a first association identification, a second telephone identification and a third IP address of the second IP telephone, and a second device identification and a fourth IP address of the second information processing device associated with the second IP telephone. In response to a message requesting for establishing a session received from the first IP telephone or the first information processing device, the call control and management information processing apparatus sends a message requesting for establishing a session between the first IP telephone and the second IP telephone, by using the first IP address of the first IP telephone and the third IP address of the second IP telephone in accordance with the registration information, to thereby establish a session between the first IP telephone and the second IP telephone, and also notifies the IP address of one of the first and second information processing devices to the other information processing device, in accordance with the registration information, to thereby establish a session between the first information processing device and the second information processing device.

The present invention also relates to the call control and management information processing apparatus described above, and further relates to a program recorded on a recording medium and a method for implementing the call control and management information processing apparatus described above.

BRIEF DESCRIPTION OF THE DRAWINGS

FIG. 10 shows an example of a registration table stored in the storage device of the call control and management server;

FIG. 16 shows an example of the registration table stored in the storage device of the call control and management server when the information processing devices of users C and D which are located near the IP mobile telephone are additionally registered in the area 2 of FIG. 14;

FIGS. 17A, 17B, 17C and 17D show examples of display screens of statuses of users' telephones and associated information processing devices in the registration table, which screens are used for establishing a telephone call session between the IP mobile telephone in the area 2 and the IP telephone in the area 3 in FIG. 14, and also for establishing a P2P communication session for data sharing between the information processing devices in the area 2 and the information processing device in the area 3, in accordance with the procedure of FIG. 12;

FIGS. 18A, 18B and 18C show examples of the display screens of statuses of users' telephones and information processing devices in the registration table of the call control and management server, which is retrieved by the user B on the information processing device according to the procedure of FIG. 18B, when the other information processing devices of the users C and D are located near the IP mobile telephone in the area 2 of FIG. 14;

FIGS. 19A, 19B and 19C show other examples of the display screens of statuses of users' telephones and information processing devices in the registration table, which screens are used for establishing a telephone call session between the IP mobile telephone in the area 2 and the IP telephone in the area 3 in FIG. 14, and also for establishing the P2P communication session between the information processing devices in the area 2 and the information processing device in the area 3, in accordance with the procedure of FIG. 12;

DESCRIPTION OF THE PREFERRED EMBODIMENTS

Two users may connect their IP telephones to each other over the IP network, and also establish a P2P session between their personal computers (PCs), so that the two users can view a Web page and the same material such as a file created by a particular application while talking over the IP telephones. However, it may be cumbersome for the users to separately operate the PCs to establish a session between the PCs.

The technique of allowing two users to connect IP telephones and establish a P2P session between their PCs is disclosed in U.S. patent application Ser. No. 11/227,209 filed on Sep. 16, 2005, by Y. Kondou, titled "SYSTEM FOR CONNECTING INFORMATION PROCESSING DEVICES ASSOCIATED WITH IP TELEPHONES", the entirety of which is incorporated herein by reference.

The inventors have recognized that it is advantageous to facilitate establishment of the P2P session between information processing devices associated with the IP telephones, at the same time when, before or after a session is established between the IP telephones.

An object of the present invention is to facilitate establishment of a P2P session between information processing devices associated with respective IP telephones, when, before or after a session is established between the IP telephones over the IP network.

According to the invention, a session between the information processing devices associated with the respective IP telephones can be established, when, before or after a session is established between IP telephones over the IP network.

The invention will be described in connection with non-limiting embodiments with reference to the accompanying drawings. Throughout the drawings, similar symbols and numerals indicate similar items and functions.

Figure 1:
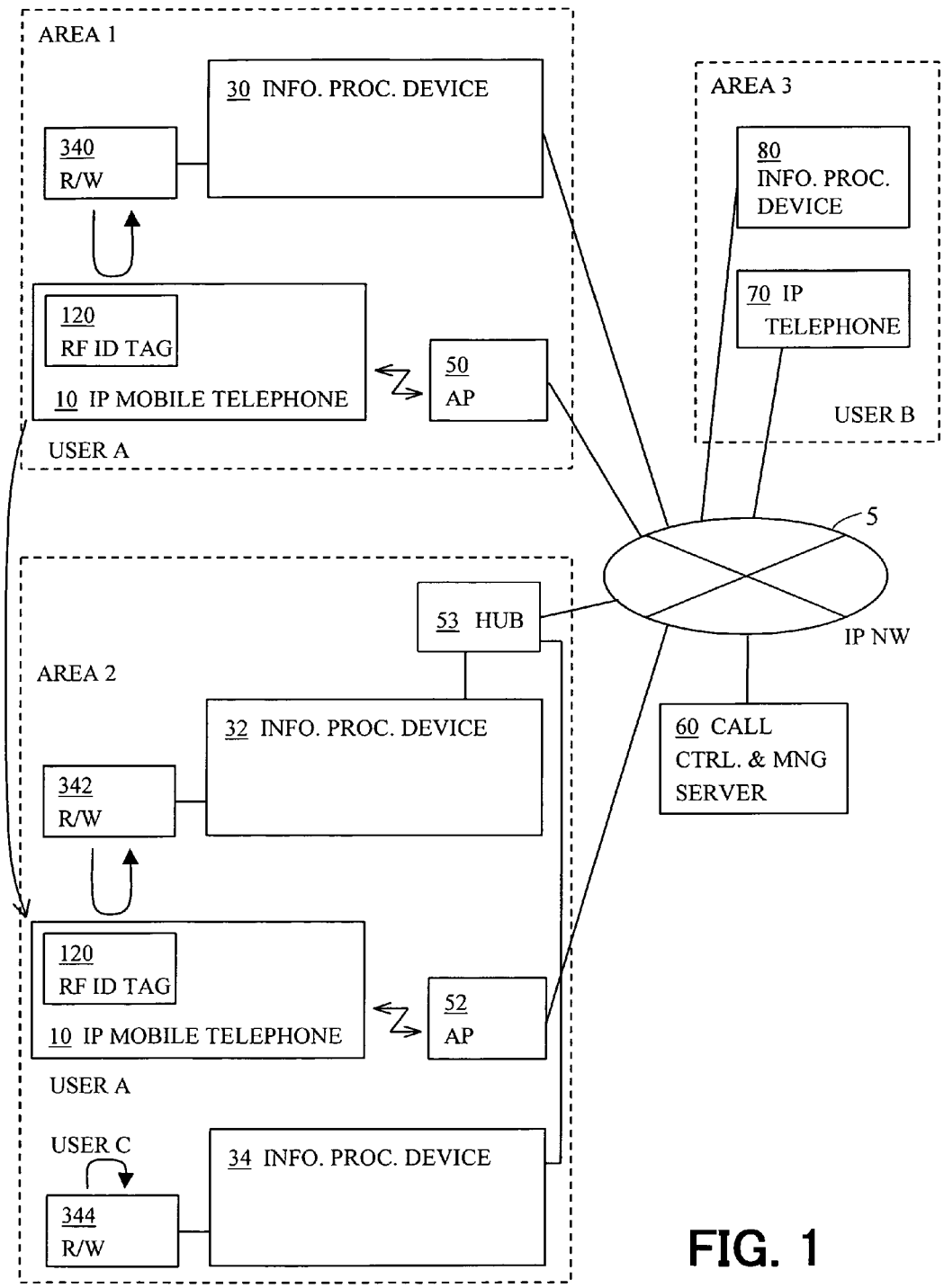
FIG. 1 shows a system in accordance with the present invention, which includes a call control and management server for controlling and managing calls on an IP network, an IP mobile or cellular telephone which can be connected via access points in areas 1 and 2 to the IP network, an information processing device located in the area 1 and connected to the IP network, and an information processing device located in area 2 and connected via a hub to the IP network, and an IP telephone and an information processing device, both of which are located in another area 3 and connected to the IP network.

FIG. 1 shows a system in accordance with the present invention, which includes a call control and management server 60 for controlling and managing calls on an IP network (IP NW) 5, an IP mobile or cellular telephone 10 of a user A which can be connected via access points (APs) 50 and 52 in areas 1 and 2 to the IP network 5, an information processing device 30 located in the area 1 and connected to the IP network 5, and an information processing device 32 located in area 2 and connected via a hub 53 to the IP network 5, and an IP telephone 70 and an information processing device 80 of a user B, both of which are located in another area 3 and connected to the IP network 5.

The IP mobile telephone 10 of the user A can move to the area 1, the area 2 and other areas. An information processing device 34 of a further user C may enter the area 2.

In FIG. 1, the IP mobile telephone 10 has an RF ID tag 120 which may be coupled to an internal bus of the IP mobile telephone 10. The information processing device 30 has an RF ID tag reader/writer device (R/W) 340 coupled via its external interface to its internal bus. The information processing device 32 has an RF ID tag reader/writer device 342 coupled via its external interface to its internal bus. The information processing device 34 has an RF ID tag reader/writer device 344 coupled via its external interface to its internal bus. The reader/writer devices 340, 342 and 344 read and write information from and into an FR ID tag. The IP telephone 70 has a similar FR ID tag (not shown) and may be an IP mobile telephone. The information processing device 80 has a similar RF ID tag reader/writer device (not shown). The information processing devices 30 to 34 and 80 may be mobile devices.

Figure 2:
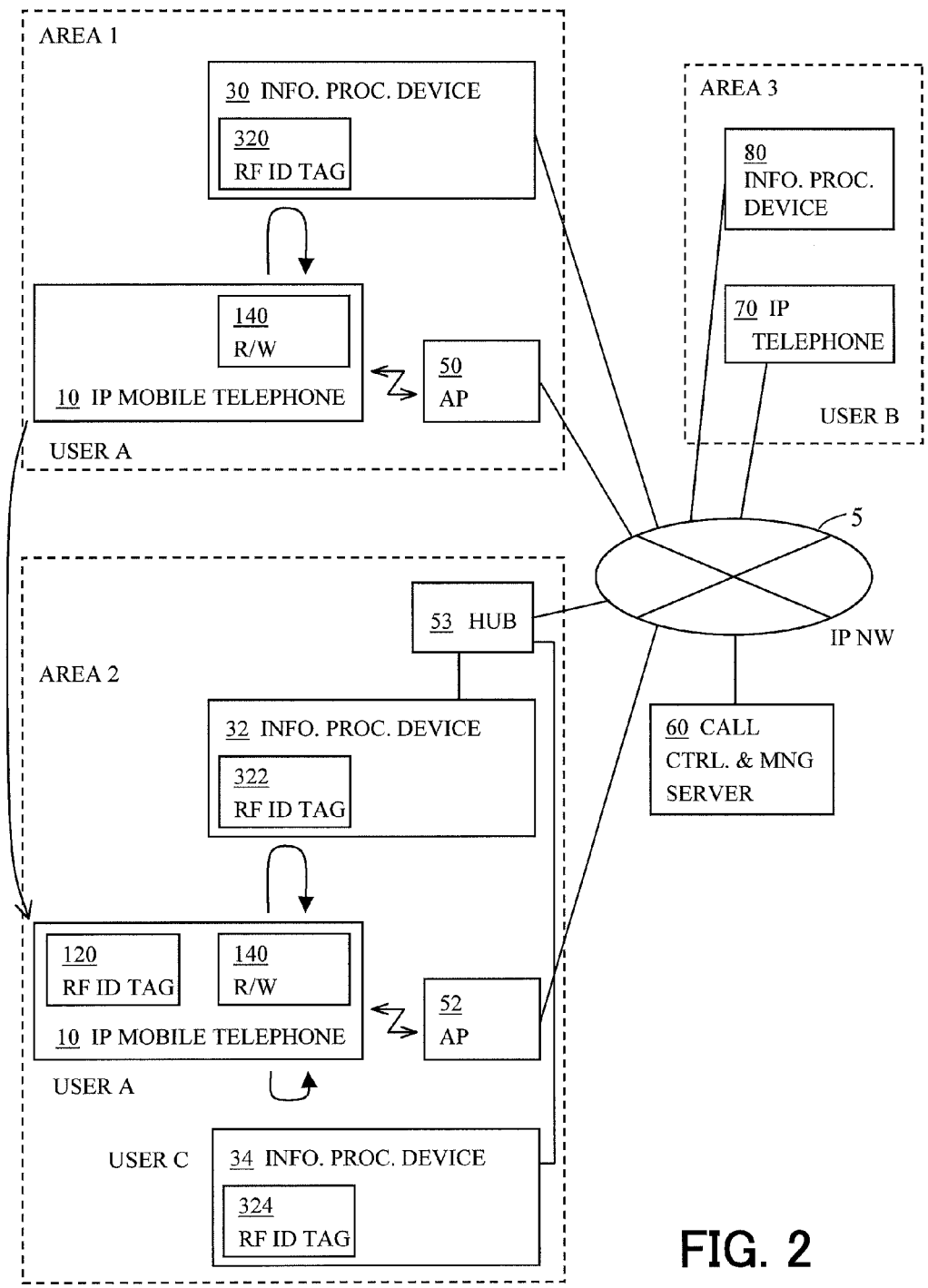
FIG. 2 is a modification of the embodiment of FIG. 1, and shows another system in accordance with another embodiment of the invention.

FIG. 2 is a modification of the embodiment of FIG. 1, and shows another system in accordance with another embodiment of the invention. In this case, the IP mobile telephone 10 has a reader/writer device 140 coupled to its internal bus. The information processing device 30 has an RF ID tag 320 coupled to its internal bus. The information processing device 32 has an RF ID tag 322. The information processing device 34 has an RF ID tag 324. The RF ID tag reader/writer device 140 reads and writes information from and to the RF ID tags 320 and 322. The IP telephone 70 has a similar RF ID tag reader/writer device (not shown). The information processing device 80 has a similar an RF ID tag (not shown).

Figure 3:
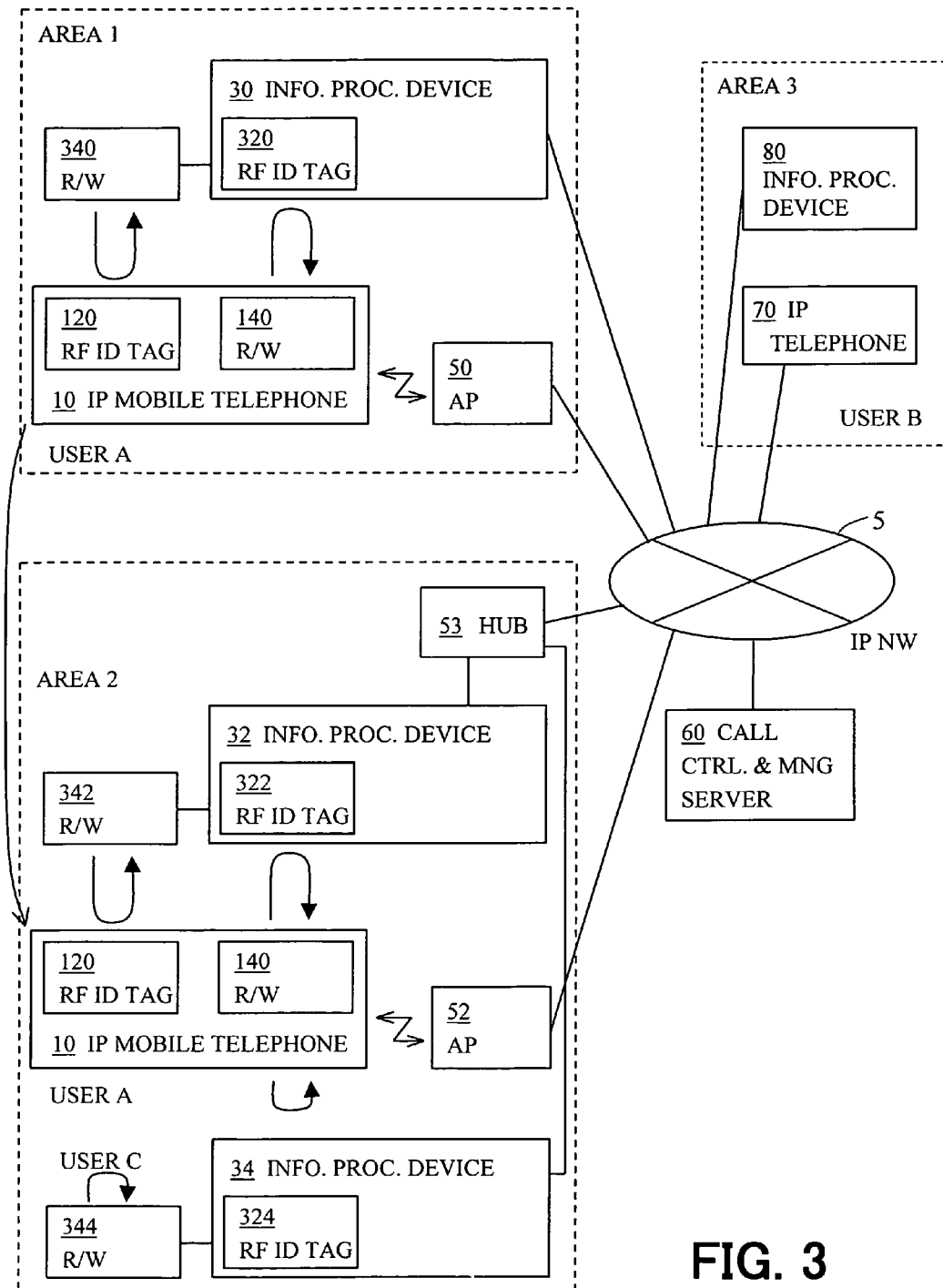
FIG. 3 is a modification of a combination of the embodiments of FIGS. 1 and 2, and shows a further system in accordance with a further embodiment of the invention.

FIG. 3 is a modification of a combination of the embodiments of FIGS. 1 and 2, and shows a further system in accordance with a further embodiment of the invention. In this case, the IP mobile telephone 10 has an RF ID tag 120 and an RF ID tag reader/writer device 140. The information processing device 30 has an RF ID tag 320 and an RF ID tag reader/writer device 340. The information processing device 32 has an RF ID tag 322 and an RF ID tag reader/writer device 342. The information processing device 34 has an RF ID tag 324 and an RF ID tag reader/writer device 344. The IP telephone 70 has an RF ID tag (not shown) and an RF ID tag reader/writer device (not shown). The information processing device 80 has an RF ID tag (not shown) and an RF ID tag reader/writer device (not shown).

Figure 4:
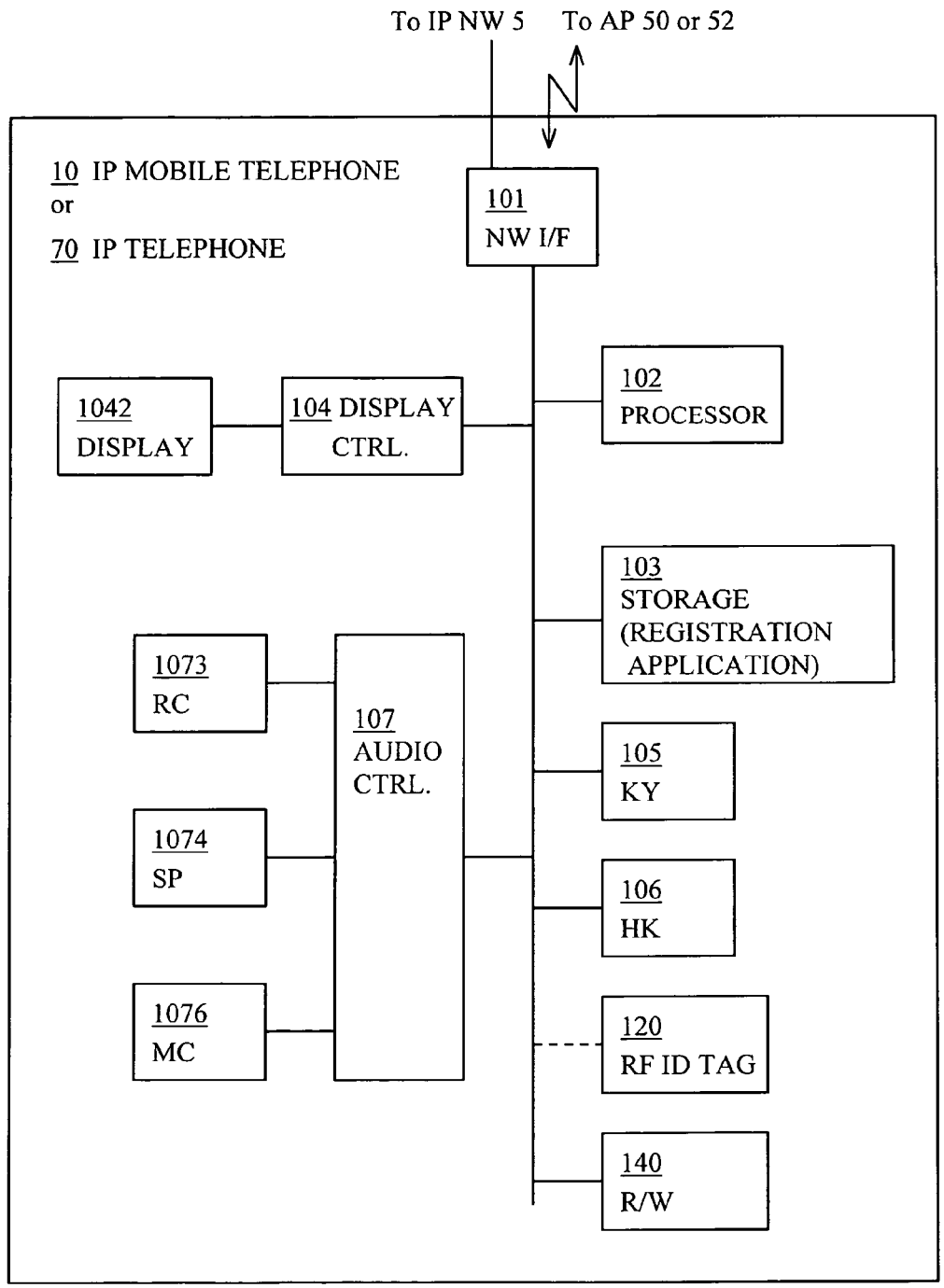
FIG. 4 shows a schematic configuration of each of the IP mobile telephones and IP telephones shown in FIGS. 1 to 3.

FIG. 4 shows a schematic configuration of each of the IP mobile telephones 10 and IP telephones 70 shown in FIGS. 1 to 3. Each of the IP mobile telephone 10 and IP telephone 70 further includes a network interface (NW I/F) 101, a processor 102, a storage device 103, a display control unit 104 connected to a display device 1042, keys (KY) 105, a hook switch (HK) 106, and an audio control unit 107 coupled to its internal bus. The audio control unit 107 is coupled to a receiver (RC) 1073, a speaker (SP) 1074 and a microphone (MC) 1076. The network interface 101 of the IP mobile telephone 10 includes a function of transmitting and receiving RF signals to and from access points 50 and 52 and connected via the access points 50 and 52 to IP network 5. The network interface 101 of the IP telephone 70 is connected to the IP network 5. The processor 102 operates in accordance with a program stored in the storage device 103. In the processor 102, at least a portion of functions of the programs may be implemented in the form of hardware. The programs include an IP address registration application program for registering an IP address of the IP mobile telephone 10 or the IP telephone 70, and possibly IP addresses of the respective information processing devices 30, 32 and 34.

The software for the processor 102 stored in the storage device 103 includes an internet protocol (IP) module for communication with the network interface 101, a TCP/UDP module implemented over the internet protocol module, a call control protocol module operating over the TCP/UDP, a packet processing unit, a voice codec for decoding packets received from the packet processing unit, a voice codec for encoding audio signals supplied to the packet processing unit, an echo canceller, a D/A converter supplying audio signals to the receiver, an A/D converter receiving audio signals from the microphone, and a DNS (Domain Name System) program, and other programs.

Figure 5:
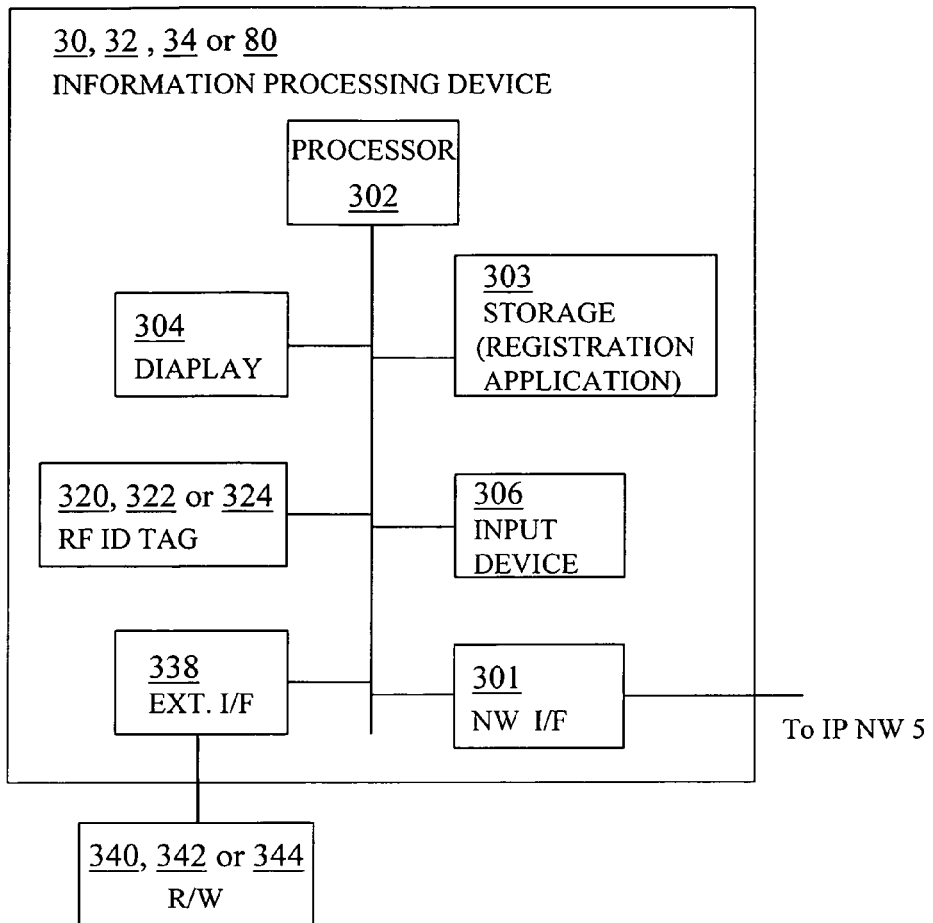
FIG. 5 shows a schematic configuration of each of the information processing devices.

FIG. 5 shows a schematic configuration of each of the information processing devices 30, 32 and 80. Each of the information processing devices 30, 32 and 80 includes a network interface (NW I/F) 301, a processor 302, a storage device 303, a display device 304, an input device 306, and an external interface (I/F) 338 coupled to a reader/writer device 340, 342 or 344, which are coupled to the internal bus. The network interface 301 is also connected to the IP network 5. The processor 302 operates in accordance with programs stored in the storage device 303. The programs also include an application program for the P2P communication or VCN (Virtual Network Computing), and may further include an IP address registration application program for registering IP addresses of respective information processing devices 30, 32 and 80. In the processor 302, at least a portion of functions of the programs may be implemented in the form of hardware. The information processing devices 30, 32 and 80 may be personal computers or PDAs (personal digital assistants).

Figure 6:
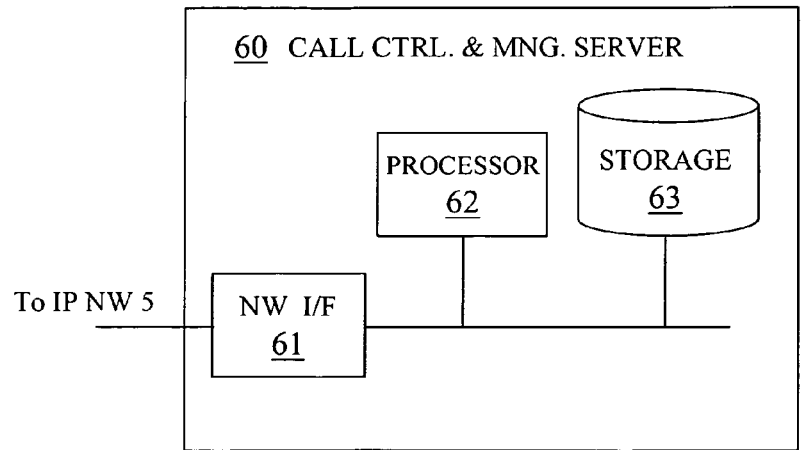
FIG. 6 shows a schematic configuration of the call control and management server.

FIG. 6 shows a schematic configuration of the call control and management server 60. The call control and management server 60 includes a network interface 61, a processor 62 and a storage device 63, which are coupled to its internal bus. The network interface 61 is also connected to IP network 5. The processor 62 operates in accordance with a program for call control and management stored in the storage device 63. At least a portion of functions of the program may be implemented in the form of hardware in the processor 62. In this embodiment, the SIP protocol is used as the call control protocol.

In FIGS. 1 to 3, in accordance with the user A's operation, the processor 102 of the IP mobile telephone 10 processes registration of an IP address of the telephone 10 with the call control and management server 60 over the IP network 5. In FIG. 2, when the reader/writer device 140 detects the RF ID tag 320, 322 or 324 of the information processing device 30, 32 or 34 near the reader/writer device 140, the IP mobile telephone 10 (the processor 102) may further register, with the call control and management server 60, the IP address and the tag ID of that information processing device in association with the registered IP mobile telephone 10. The IP telephone 70 registers an IP address and a tag ID similarly to the IP mobile telephone 10.

In FIG. 1, in accordance with the user A's operation, the processor 302 of each of the information processing devices 30, 32, 34 and 80 processes registration of an IP address of that information processing device with the call control and management server 60. When the reader/writer device 340, 342 or 344 detects the RF ID tag 120 of the IP mobile telephone 10, the processor 302 of each of the information processing devices 30, 32 and 34 may register the IP address of that information processing device and the detected tag ID of the IP mobile telephone 10 in association with the registered IP mobile telephone 10 with the call control and management server 60. The information processing device 80 may register its own IP address and tag ID with the call control and management server 60 in association with the registered IP telephone 70, similarly using or not using the RF ID tag.

Figure 7:
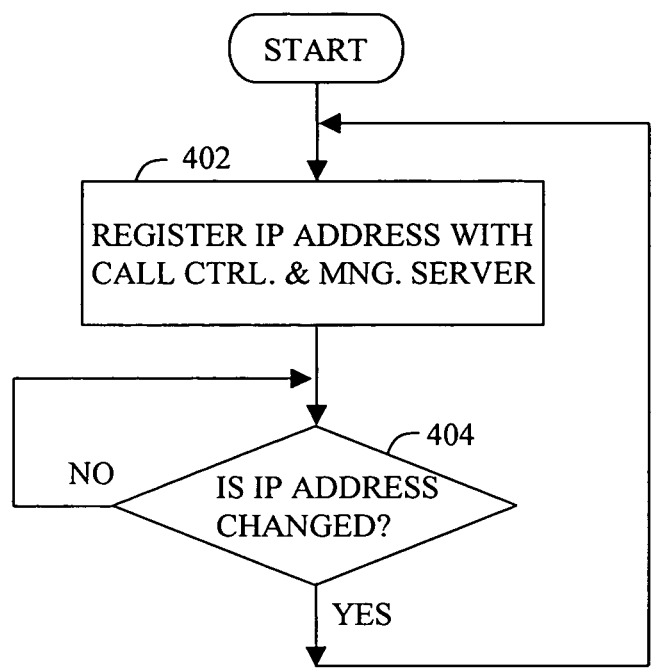
FIG. 7 shows a flow chart for registering the IP addresses, which is executed by the processor of each of the IP mobile telephone and the IP telephone and the processor of each of the information processing devices, in accordance with the registration application.

FIG. 7 shows a flow chart for registering an IP addresses, which is executed by the processor 102 of each of the IP mobile telephone 10 and the IP telephone 70 and the processor 302 of each of the information processing devices 30 to 34 and 80, in accordance with the registration application.

Referring to FIG. 7, at Step 402, when the key or the input device (the keys 105, the input device 306) for the registration is operated by a user, the processor 102 of each of the IP mobile telephone 10 and the IP telephone 70 and the processor 302 of each of the information processing devices 30 to 34 and 80 connects that telephone or information processing device to the call control and management server 60 over the IP network 5 to register or update its IP address (e.g., 10.10.10.1), user name, tag ID and the like. The processor 62 of the call control and management server 60 stores or updates a registration or registered name or identification, the IP address, the user name, the tag ID and the like of the IP mobile telephone 10, the IP telephone 70 and the information processing devices 30 to 34 and 80 in a registration table or database (DB) in the storage device 63. After that, the processor 102 or 303 at Step 404 determines whether or not the IP address of the mobile telephone 10, IP telephone 70 or information processing devices 30 to 34 or 80 is changed. Step 404 is repeated until the IP address is changed. If it is determined at Step 404 that the IP address is changed, the procedure proceeds to Step 402.

The information to be registered with the call control and management server 60 is not limited to IP addresses as described above, and may include property information, such as types of the information processing devices 30 to 34 and 80 (e.g., PC and PDA), identifications of available applications (e.g., App1 and App2) and display resolutions (e.g., 800×600 (SVGA), 1024×768 (XGA), 320×240 (QVGA) and 480×640 (VGA)). The available application may be a known application which has functions, for example, for transferring information displayed on a display device of one information processing device to another information processing device for displaying, and for displaying, on the display device of the one information processing device, information received from the other information processing device. Alternatively, it may be a known application which has functions, for example, for temporarily establishing a P2P communication session between the information processing devices to share a file between them.

Figures 8A, 8B:
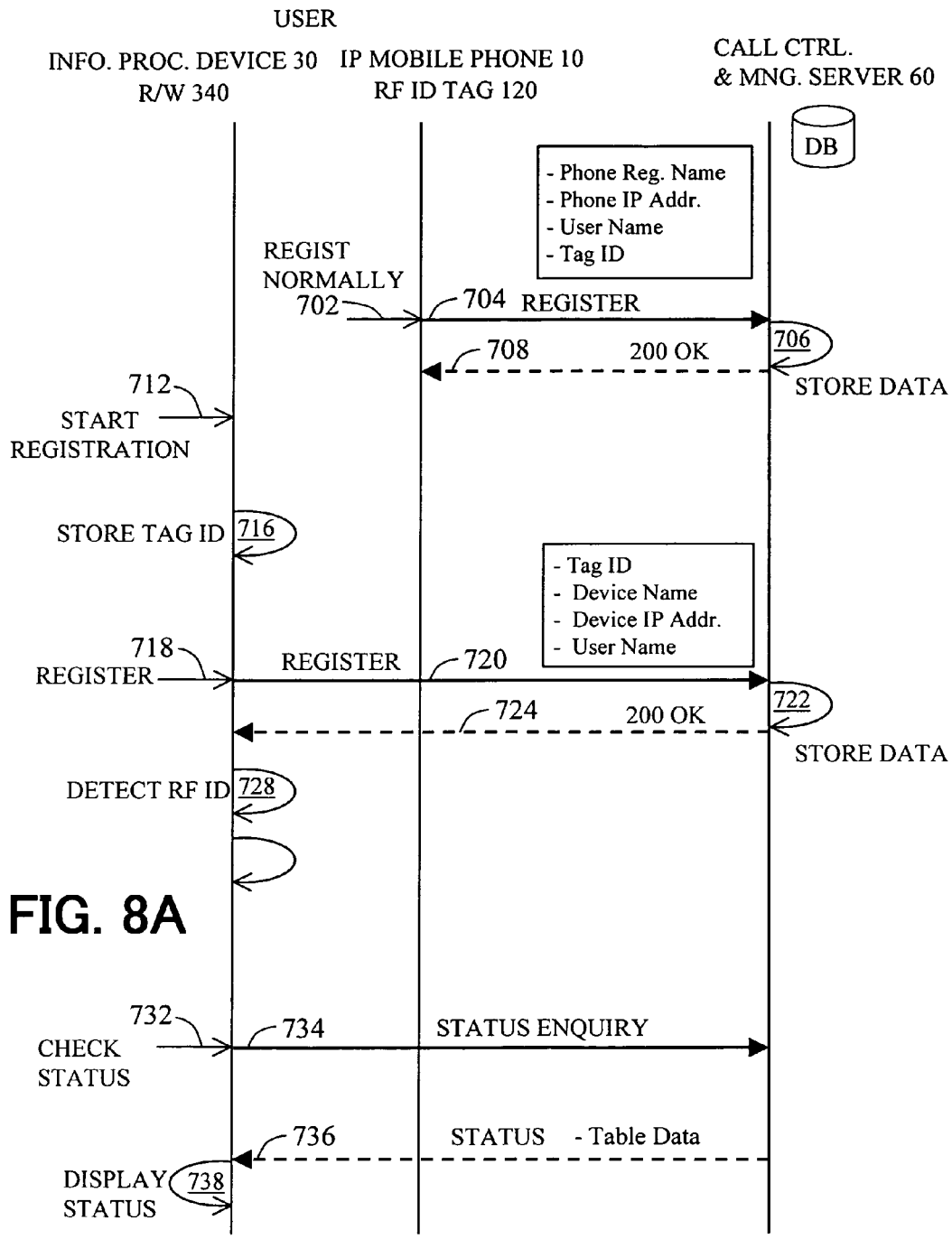
FIG. 8A shows a communication procedure for the IP mobile telephone and the information processing device of FIG. 1 to communicate and register themselves with the call control and management server.
FIG. 8B shows a procedure for the information processing device to communicate with the call control and management server to enquire session statuses of the registered telephones and the information processing devices.

FIG. 8A shows a communication procedure for the IP mobile telephone 10 and the information processing device 30 of FIG. 1 to communicate and register themselves with the call control and management server 60.

In process 702, the user A activates the registration application on the IP mobile telephone 10 to initiate registration of the IP mobile telephone 10, and operates the keys 105 to input a registration or registered name and a user name of the IP mobile telephone 10. In process 704, the IP mobile telephone 10 (the processor 102) sends to the call control and management server 60 a SIP message of "REGISTER" in the text format including registration items in an IP packet. The message contains "REGISTER" in a request line, predetermined control information in a header field (e.g., SIP URI "sip:IP-Phn1@10.10.10.1" containing the registered name (telephone device name) and the IP address in a "From" header and a "To" header), the user name "A" and the tag ID of the RF ID tag 120 of the IP mobile telephone 10 in a body.

In process 706, the call control and management server 60 (the processor 62) stores the registration or registered name (telephone device name), the IP address, the user name and the tag ID of the IP mobile telephone 10 in the registration table or database (DB) of the storage device 63.

In process 708, the call control and management server 60 (the processor 62) sends a SIP response message of "200 OK" in the IP packet back to the IP mobile telephone 10. The SIP response message contains "200 OK" in the response line, the predetermined control information in the header field (e.g., SIP URI "sip:IP-Phn1@10.10.10.1" containing the registered name and the IP address in the "From" header and the "To" header) and arbitrary information in the body.

In process 712, the user A activates the registration application (in the storage device 303) on the information processing device 30 to initiate the registration of the information processing device 30. In process 716, the information processing device 30 (the processor 302) causes the reader/writer device 340 to read tag information including a tag ID of the RF ID tag 120 and stores the information in the storage device 303.

In process 718, the user A operates the input device 306 of the information processing device 30 to input the registered name and the user name of the information processing device 30 and then to initiate registration of the information processing device 30 with the call control and management server 60. In process 720, the information processing device 30 (the processor 302) sends, to the call control and management server 60, the SIP message of "REGISTER" in the text format including registration items in the IP packet. The SIP message contains "REGISTER" in the request line, predetermined control information in the header field (e.g., SIP URI "sip:IP-Phn1@10.10.10.2" containing the registered name (telephone device name) and the IP address in the "From" header and the "To" header), the user name "A" and the tag ID of the RF ID tag 120 of the IP mobile telephone 10 in the body.

In process 722, the call control and management server 60 (the processor 62) stores the registered name, IP address and the user name in association with the registered IP mobile telephone 10 having the tag ID, in the registration table or database in the storage device 63.

In process 724, the call control and management server 60 (the processor 62) sends a SIP response message of "200 OK" in the IP packet back to the information processing device 30. The SIP response message contains "200 OK" in the response line, the predetermined control information in the header field (e.g., SIP URI "sip:WSpc@10.10.20.2" containing the registered name and the IP address in the "From" header and the "To" header) and arbitrary information in the body. After that, in process 728, the reader/writer device 340 repeats detection of an RF ID tag.

FIG. 8B shows a procedure for the information processing device 30 to communicate with the call control and management server 60 to enquire session statuses of the registered telephones and the information processing devices.

In process 732, the user A operates the information processing device 30 to check the session statuses of the registered telephones and information processing devices. In response to the operation, the information processing device 30 (the processor 302) in process 734 sends the SIP message of "STATUS ENQUIRY" to the call control and management server 60 over the IP network 5. In response to the status enquiry, the call control and management server 60 (the processor 62) in process 736 sends back the SIP response message of "STATUS" including data such as the session statuses and other items in the registration table which is stored in the storage device 63. In process 738, the information processing device 30 (the processor 302) receives the SIP response massage of "STATUS" and displays the session status data of the registration table on the display device 1042.

Figure 9:
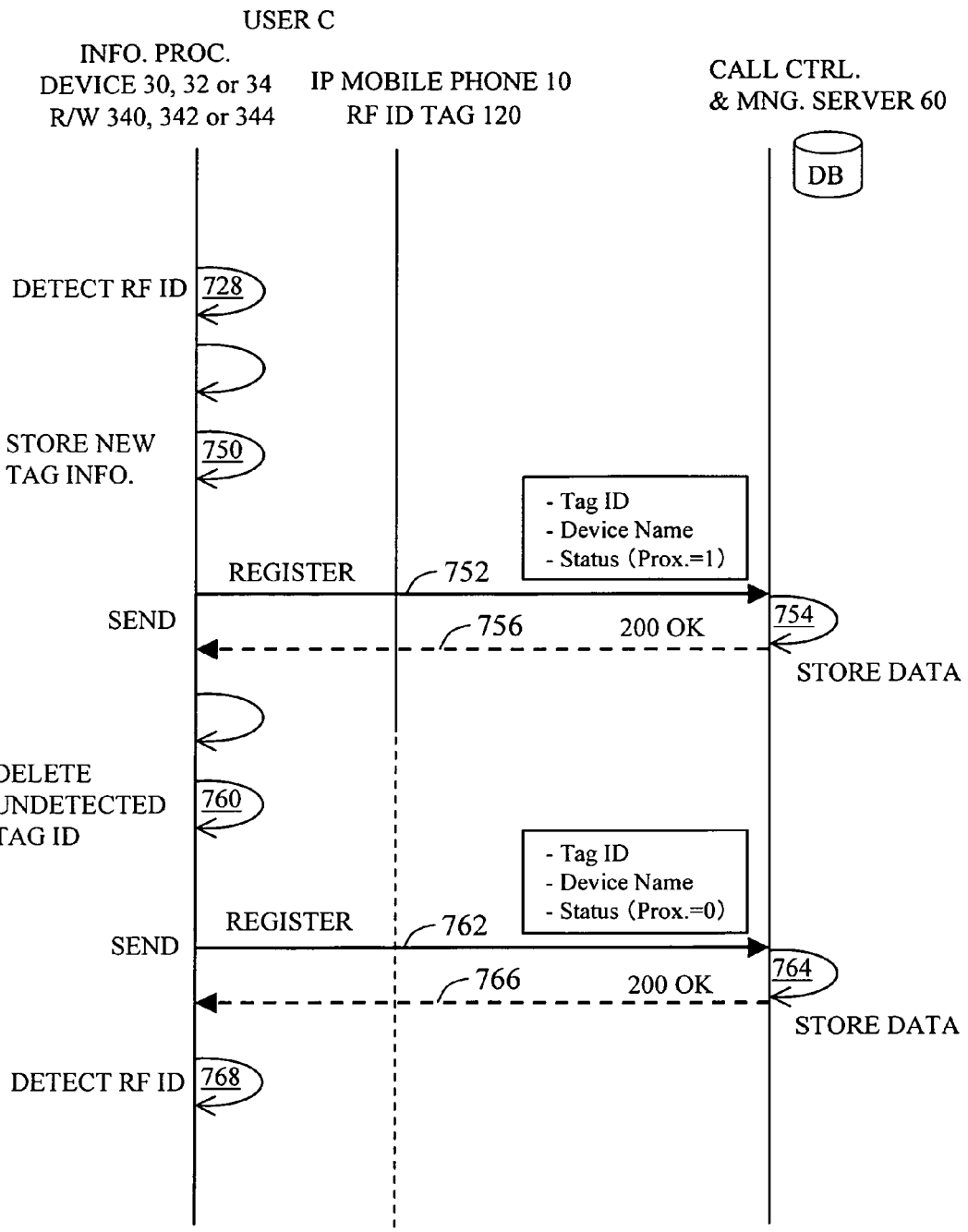
FIG. 9 shows a procedure for the information processing device of FIG. 1 to update data of the information processing device stored in the call control and management server.

FIG. 9 shows a procedure for the information processing device 30, 32 or 34 of FIG. 1 to update data of the information processing device 30, 32 or 34 stored in the call control and management server 60.

In process 728, a user, for example, the user A operates the information processing device 30 to cause the reader/writer device 340 to start cyclic detection of an RF ID tag. If the IP mobile telephone 10 approaches the reader/writer device 340, then the reader/writer device 340 in process 750 reads the tag ID of the RF ID tag 120 of the IP mobile telephone 10, and the processor 302 of the information processing device 30 stores the read tag ID and a proximity flag value (=1) in the storage device 303. The proximity flag indicates whether or not the IP mobile telephone 10 associated with the tag ID is located near the information processing device 30, where a value "1" of the proximity flag indicates that it is in the proximity and a value "0" of the proximity flag indicates that it is not in the proximity. In process 752, the information processing device 30 (the processor 302) sends, to the call control and management server 60, the SIP message of "REGISTER" including the tag ID of the IP mobile telephone 10, the registered name of the information processing device 30, and the status flag value (=1).

In process 754, the call control and management server 60 (the processor 62) receives the SIP message of "REGISTER" and sets or updates to the value "1" the proximity flag of the registered name of the information processing device 30, which is associated with the registered name of the mobile telephone 10 having the tag ID in the registration table. When the registered name of the information processing device 30 is not associated with the registered name of the IP mobile telephone 10, such update is not performed. Alternatively, when the registered name of the information processing device 30 is not associated with the registered name of the IP mobile telephone 10, only if there is another entry for associating the registered name of the information processing device 30 with a registered name of another IP telephone, the call control and management server 60 (the processor 62) may look into the other entry, and generate and add to the registration table an entry for associating the registered name of the information processing device 30 with the registered name of the IP mobile telephone 10, and then set the value "1" to its proximity flag. In process 756, the call control and management server 60 (the processor 62) sends the SIP response message of "200 OK" back to the information processing device 30.

After that, when the information processing device 30 moves away from the IP mobile telephone 10, the reader/writer device 340 in process 760 fails to read the RF ID tag 120 of the mobile telephone 10, and the processor 302 of the information processing device 30 stores, in the storage device 30, the proximity flag value "0" for the missing tag ID of the RF ID tag 120. In process 762, the information processing device 30 (the processor 302) sends, to the call control and management server 60, a SIP message of "REGISTER" including the tag ID of the IP mobile telephone 10, the registered name of the information processing device 30, and the status flag value (=0).

In process 764, the call control and management server 60 (the processor 62) receives the SIP message of "REGISTER" and updates the proximity flag value to the value "0" in the entry for associating the registered name of the information processing device 30 with the registered name of the IP mobile telephone 10 having the tag ID in the registration table of the storage device 63. When the user name of the IP mobile telephone or IP telephone is different from that of the information processing device in the entry in which the proximity value is changed to "0", the call control and management server 60 (the processor 62) may delete the entry. In process 766, the call control and management server 60 (the processor 62) sends back the SIP response message of "200 OK" to the information processing device 30. In process 768, the reader/writer device 340 of the information processing device 30 continues cyclic detection of an RF ID tag.

FIG. 10 shows an example of the registration table stored in the storage device 63 of the call control and management server 60. The registration table of FIG. 10 includes entries, each including a registered name, a user name, a current IP address, a current session status (e.g., established or released), tag IDs of RF ID tags and a proximity flag value (0/1) for the IP mobile telephone 10, the IP telephone 70 or the like, and further including a registered name, a user name, a current IP address and a current session status for the information processing devices 30, 32, 70 or the like associated by the tag ID with that telephone. The RF ID tag 120 of FIGS. 1 and 3 may store a tag ID including the registered name and/or the user name of the IP mobile telephone 10. The RF ID tag 32 of FIGS. 2 and 3 may store a tag ID including the registered name and/or the user name of the information processing device 30. Each entry in the registration table of FIG. 10 may further include identifications of the applications available in the associated information processing devices 30, 32 and 80, and resolutions of their display devices.

In FIG. 10, for example, an entry for the IP mobile telephone 10 includes the registered name "IP-phnl", the user name "A", the IP address "10.10.10.1", the session status "Released", and the tag ID of RF ID tag 120 "XXX . . . " and the tag ID of the RF ID tag 20 "YYY . . . ". The entry for associating the information processing device 30 with the IP mobile telephone 10 further includes the proximity flag value "1", the registered name "WSpc", the user name "A", the IP address "10.10.20.2", and the session status "Released". When the telephone call or communication session is in the established or busy status, "Established" or "Busy" is indicated in the field of session status and a registered name of an IP telephone of another party to communicate with is also recorded. When the session of the information processing device is in the established status, "Established" is indicated in the field of session status, and a registered name or names of one or more information processing devices of the other party to communicate with is also recorded. In this case, the registered names of three information processing devices of the user A that are associated with the registered name of the IP mobile telephone 10 are registered in the registration table.

In the configuration of FIG. 1, a field of the tag ID in an entry of the registration table contains a tag ID "XXX . . . " of an RF ID tag of an IP mobile telephone or IP telephone. In the configuration of FIG. 2, a field of the tag ID in an entry of the registration table contains a tag ID "YYY . . . " of an RF ID tag of an information processing device associated with an IP mobile telephone or IP telephone. In the configuration of FIG. 3, a field of the tag ID in an entry of the registration table contains a tag ID "XXX . . . " of an RF ID tag of an IP mobile telephone or IP telephone, and a tag ID "YYY . . . " of an RF ID tag of an information processing device associated with the IP mobile telephone or IP telephone.

Figure 11:
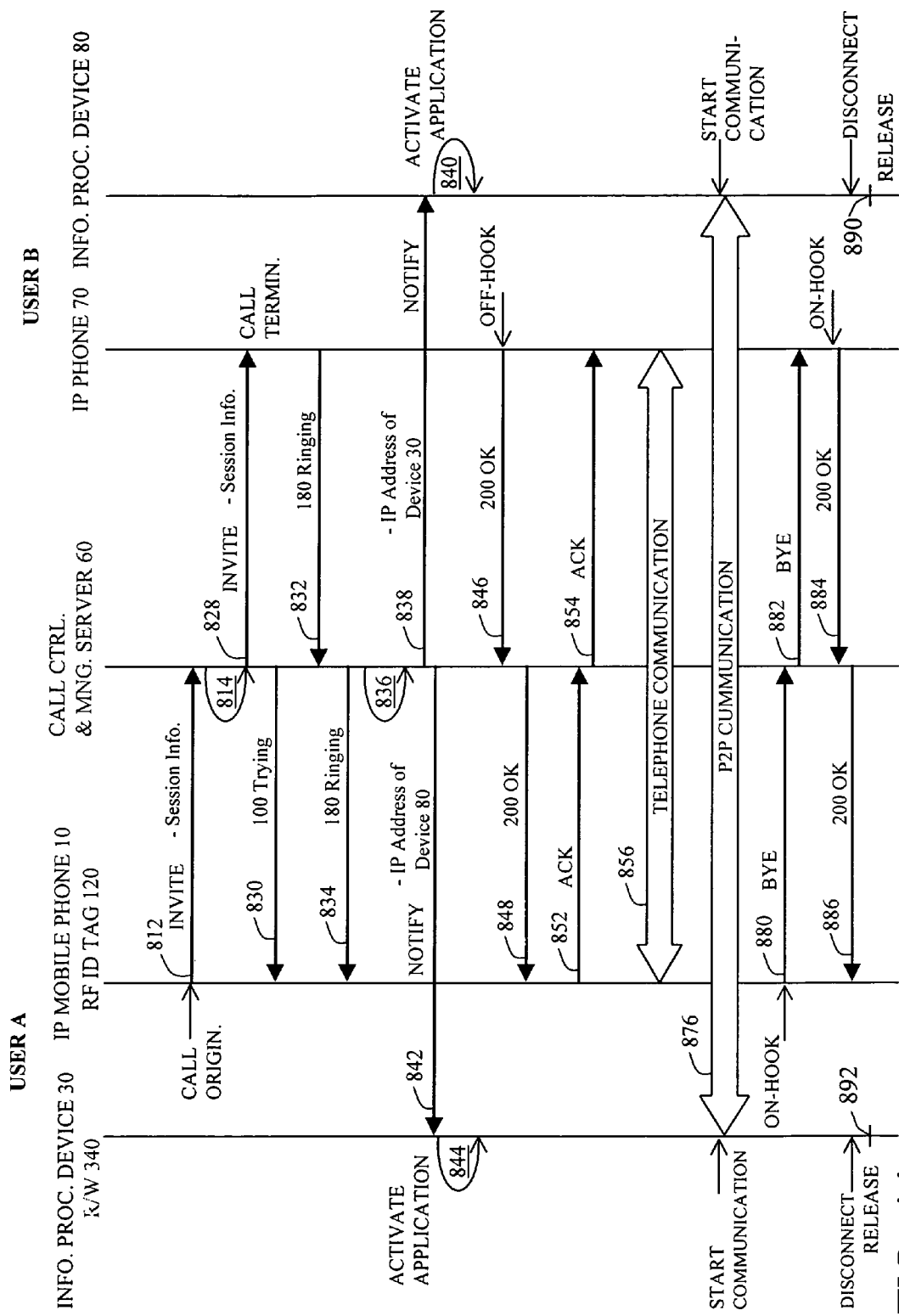
FIG. 11 shows a communication procedure for the IP mobile telephone to call the IP telephone over the IP network and then cause the information processing devices associated with the two respective telephones to connect to each other, which procedure occurs after the registration of the IP mobile telephone, the IP telephone and information processing devices with the call control and management server in accordance with the procedure of FIG. 8A.

FIG. 11 shows a communication procedure for the IP mobile telephone 10 to call the IP telephone 70 over the IP network 5 and then cause the information processing devices 30 and 80 associated with the two respective telephones to connect to each other, which procedure occurs after the registration of the IP mobile telephone 10, the IP telephone 70 and information processing devices 30 and 80 with the call control and management server 60 in accordance with the procedure of FIG. 8A.

When the IP mobile telephone 10 carried by the user A is located near the information processing device 30 in the area 1, the value "1" is set to the proximity flag of the information processing device 30 associated with the registered name of the IP mobile telephone 10 in the registration table of FIG. 10, in accordance with the procedure of FIG. 9. The user A originates a call to the IP telephone 70 by taking the IP mobile telephone 10 off the hook and entering the registered name (e.g., IP-Phn2) of the IP telephone 70 to be called.

In process 812, the processor 102 of the IP mobile telephone 10 converts the registered name into a SIP URI (e.g., sip:IP-Phn2@10.10.10.2), and sends, to the call control and management server 60, an IP packet of a SIP message containing the SIP URI in the "To" header of the header field, in a known manner. The SIP message contains "INVITE" indicating a call request in the request line, predetermined control information containing SIP URIs in the "From" header and the "To" header respectively of the header field, and session information in the body describing a data format and the like. When an IP telephone number (e.g., 050-88888888) is inputted as a user identifier of the called IP telephone 70 by the user, the IP mobile telephone 10 may obtain the corresponding registered name via an ENUM server (not shown) on the IP network 5. Alternatively, when the call control and management server 60 receives the SIP message containing the IP telephone number of the called IP telephone 70 in the header field, the call control and management server 60 may obtain the corresponding registered name via the ENUM server (not shown) on the IP network 5. In process 814, the call control and management server 60 (the processor 62) changes the session status of the IP mobile telephone 10 from "Released" to "Established" in the registration table of FIG. 10.

In process 828, the call control and management server 60 (the processor 62) sends a SIP message of "INVITE" to the IP telephone 70 using its SIP URI as a destination. The call is terminated at the IP telephone 70, i.e., the IP telephone 70 (the processor 102) receives the incoming SIP message, and generates ringing or a beep sound through the speaker 1074 in response to the receipt of the SIP message. In process 830, the call control and management server 60 (the processor 62) sends back to the IP mobile telephone 10, the SIP message (containing "100 Trying" in a status line) indicating that the call request is being processed.

In process 832, in response to the call termination, the IP telephone 70 (the processor 102) sends back to the call control and management server 60 a SIP message of "180 Ringing" indicating that the ringing is occurring. In process 834, in response to the receipt of the SIP message of "180 Ringing", the call control and management server 60 (the processor 102) sends, to the IP mobile telephone 10, the SIP message of "180 Ringing" indicating that ringing is occurring. In response to the receipt of the SIP message of "180 Ringing", the mobile telephone 10 (the processor 102) continues to generate the ringing sound through the receiver 1073 until the IP telephone 70 goes off-hook.

In process 836, the call control and management server 60 (the processor 62) looks up the registration table to determine the information processing device 30 which has the proximity flag value of "1" and is associated with the registered name of the IP mobile telephone 10, and also determine the information processing device 80 which has the proximity flag value of "1" and is associated with the registered name of the IP telephone 70. In processes 838 and 842, the call control and management server 60 (the processor 62) sends SIP messages of "NOTIFY" to the determined information processing devices 30 and 80 using their respective IP addresses as destinations. The SIP message contains "NOTIFY" in the request line, predetermined control information in the header field, and the registered name, the IP address and the available application identifiers of the other information processing device (80 or 30) in the body. In process 840, the information processing device 80 (the processor 302) activates the P2P communication application. In process 844, the information processing device 30 (the processor 302) activates the P2P communication application.

When the user B takes the IP telephone 70 off the hook, the IP telephone 70 (the processor 102) in process 846 sends, to the call control and management server 60, a SIP message of "200 OK" indicating off-hook. In process 848, in response to the receipt of the SIP message, the call control and management server 60 (the processor 62) sends, to the IP mobile telephone 10, a SIP message of "200 OK" indicating off-hook.

In process 852, in response to the receipt of the SIP message (200 OK) indicating off-hook, the IP mobile telephone 10 (the processor 102) sends, to the call control and management server 60, the SIP message 531 of "ACK" indicating acknowledgment. Thus the IP mobile telephone 10 enters into the established status. In process 854, in response to the receipt of the SIP message, the call control and management server 60 (the processor 62) sends, to the IP telephone 70, the SIP message 631 of "ACK" indicating acknowledgement. Thus, the IP telephone 70 enters into the established status of the telephone communication. The SIP message contains ACK in the request line. After that, in process 856, the telephone call session is established between the IP mobile telephone 10 and the IP telephone 70.

When each of the information processing devices 30 and 80 (the processor 302) receives the SIP message of "NOTIFY", each information processing device can obtain the IP address of the other information processing device. The user A operates the information processing device 30 to start the P2P communication, and the call control and management server 60 (the processor 62) sets the session status of the information processing device 30 into the established status in the registration table. Thus, in process 876, the P2P communication session or connection for data sharing between the information processing devices 30 and 80 is established.

In accordance with the user's operation and with the P2P communication application, the information processing device 30 or 80 (the processor 302) sends a data file to be shared, such as a file of image information, to the P2P communication application in the other information processing device 80 or 30 with its IP address.

Alternatively, in process 876, upon obtaining the IP address of the other information processing device, each of the information processing devices 30 and 80 (the processor 302) may start P2P communication automatically, independently of user's operation.

After that, when either one of the users operates the IP mobile or IP telephone 10 or 70 to go on-hook, for example the user A operates the IP mobile telephone 10 to go on-hook, the IP mobile telephone 10 (the processor 102) in process 880 sends, to the call control and management server 60, a SIP message of "BYE" indicating a notification of the end of the session. In response to the receipt of the SIP message (BYE), the call control and management server 60 (the processor 62) sets the session status of the mobile telephone of the registration table into the released status, and in process 882 sends the SIP message of "BYE" to the IP telephone 70. In response to the receipt of the SIP massage (BYE), the IP telephone 70 (the processor 102) generates through the receiver 1073 the sound indicating that the call has been released. When the other user operates the IP telephone 70 to go on-hook, the IP telephone 70 in process 884 sends, to the call control and management server 60, the SIP message "200 OK" indicating on-hook. In response to the receipt of the SIP message (200 OK), the call control and management server 60 (the processor 62) sets the session status of the IP telephone 70 in the registration table into the released status, and in process 886 sends the SIP message of "200 OK" to the IP mobile telephone 10. In response to receipt of the SIP message (200 OK), the IP mobile telephone 10 (the processor 102) releases the telephone call session.

After the session is established, the processor 302 of each of the information processing devices 30 and 80 in process 890 or 892 releases the session in accordance with the operation by the user A or B at any time.

Figure 12:
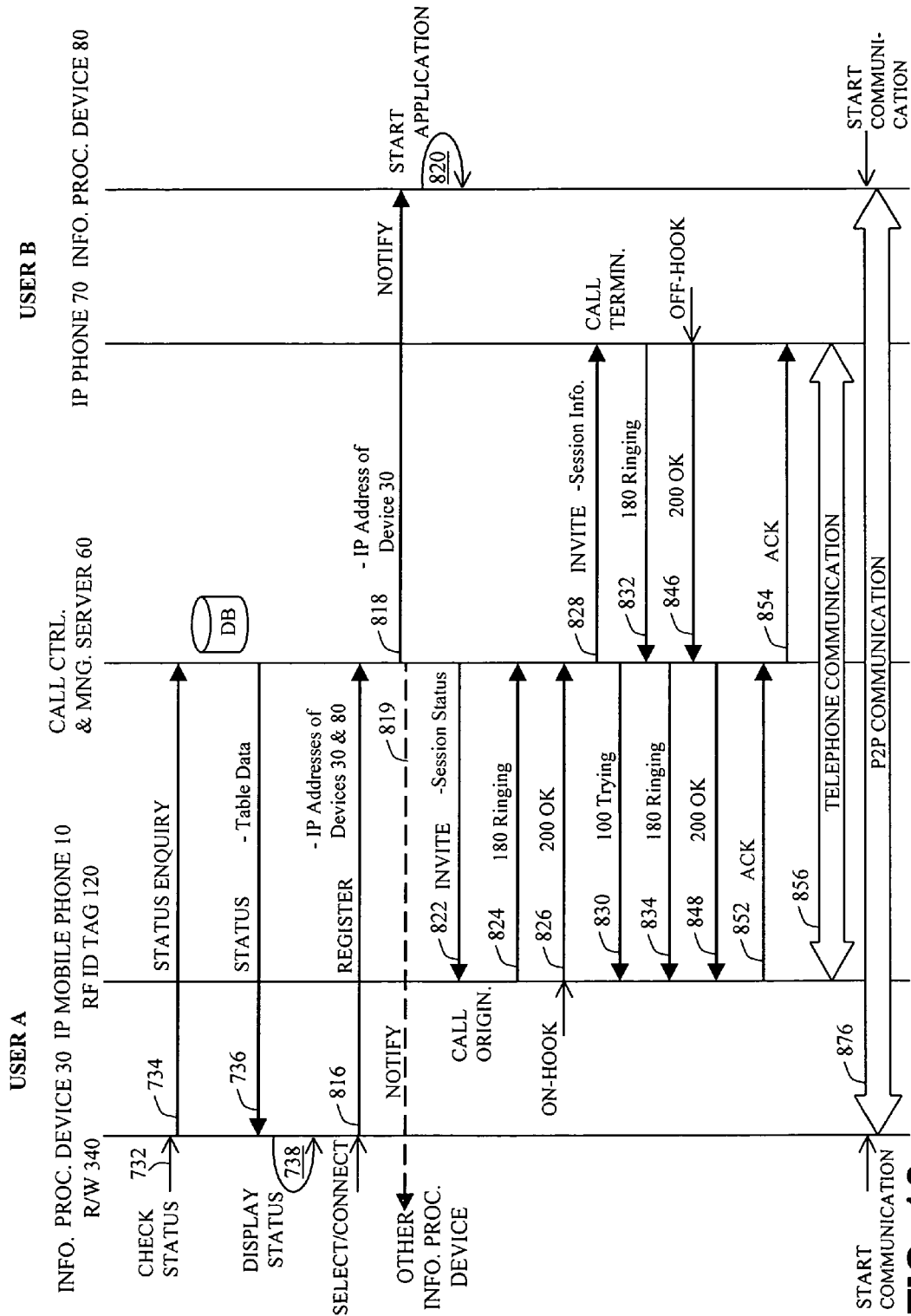
FIG. 12 shows a communication procedure for the information processing device to activate, over the IP network, the P2P communication application of the information processing device to be ready for P2P communication and then cause the IP mobile telephone and IP telephone associated with the two respective information processing devices to be called for a telephone call session, which procedure occurs after the registration of the IP mobile telephone, the IP telephone and information processing devices with the call control and management server in accordance with the procedure of FIG. 8A.

FIG. 12 shows a communication procedure for the information processing device 30 to activate, over the IP network 5, the P2P communication application of the information processing device 80 to be ready for P2P communication and then cause the IP mobile telephone 10 and IP telephone 70 associated with the two respective information processing devices to be called for a telephone call session, which procedure occurs after the registration of the IP mobile telephone 10, the IP telephone 70 and information processing devices 30 and 80 with the call control and management server 60 in accordance with the procedure of FIG. 8A.

When the IP mobile telephone 10 carried by the user A is located near the information processing device 30 in the area 1, the value "1" is set to the proximity flag of the information processing device 30 associated with the IP mobile telephone 10 in the registration table of FIG. 10, in accordance with the procedure of FIG. 9. The user A activates the P2P communication application on the information processing device 30 to perform processes 732 to 738.

In process 738, based on the information of the registration table displayed on the display device 304, the user A checks the statuses and the proximity flag values of the information processing devices associated with the other IP telephone 70 and operates the information processing device 30 to select and connect the information processing device 80 to perform P2P communication with the information processing device 30 for data sharing. In process 816, the information processing device 30 (the processor 302) sends, to the call control and management server 60 over the IP network 5, the SIP message of "REGISTER" containing the registered name and the IP address of the selected information processing device 80. In process 818, the call control and management server 60 (the processor 62) sends the SIP message of "NOTIFY" over the IP network 5 to the information processing device 80 at the IP address thereof. In response to the receipt of the SIP message, the information processing device 80 (82) in process 820 activates the P2P communication application.

In response to the receipt of the SIP message of "REGISTER", the call control and management server 60 (the processor 62) in process 822 sends a SIP message of "INVITE" to the IP mobile telephone 10 using its SIP URI as a destination. In process 824, the IP mobile telephone 10 (the processor 102) sends back to the call control and management server 60 the SIP message of "180 Ringing" indicating that the ringing is occurring. When the user A takes the IP mobile telephone 10 off the hook, the IP mobile telephone 10 in process 826 sends the SIP message of "200 OK" indicating off-hook to the call control and management server 60.

In response to the receipt of the SIP message (200 OK), the call control and management server 60 (the processor 62) in process 828 sends the SIP message of "INVITE" to the IP telephone 70 using its SIP URI as a destination. Processes 830-834, 846-854, 856 and 876 are similar to those of FIG. 11, and hence are not described again.

The procedure of FIG. 12 is also applicable to the situation that the IP mobile telephone 10 carried by the user A is located in the area 2. In this case, the information processing device 30 is replaced with the information processing device 32. In process 738, the user A may look up the registration table displayed on the display device 304 of the information processing device 32 (the processor 302) in the area 2, and operate the information processing device 32 to select and connect the other information processing devices 34, 80 and the like to perform P2P communication for data sharing among three or more information processing devices 32, 80, 34 and the like of three or more users A, B, C and the like that have the proximity flag values of "1" and are associated with the IP mobile telephone 10 and with the IP telephone 70. In this case, in process 816, the registered names and the IP addresses of the information processing devices 32, 34, 80 and the like are sent to the call control and management server 60. In process 818, the IP addresses of the information processing devices 32, 34 and the like are sent to the information processing device 80. In process 819, the IP addresses of the information processing devices 32 and 80 are sent to the information processing devices 34. Thus the P2P communication session can be established among the plurality of information processing devices associated with the IP mobile telephone 10 and with the IP telephone 70.

Figure 13:
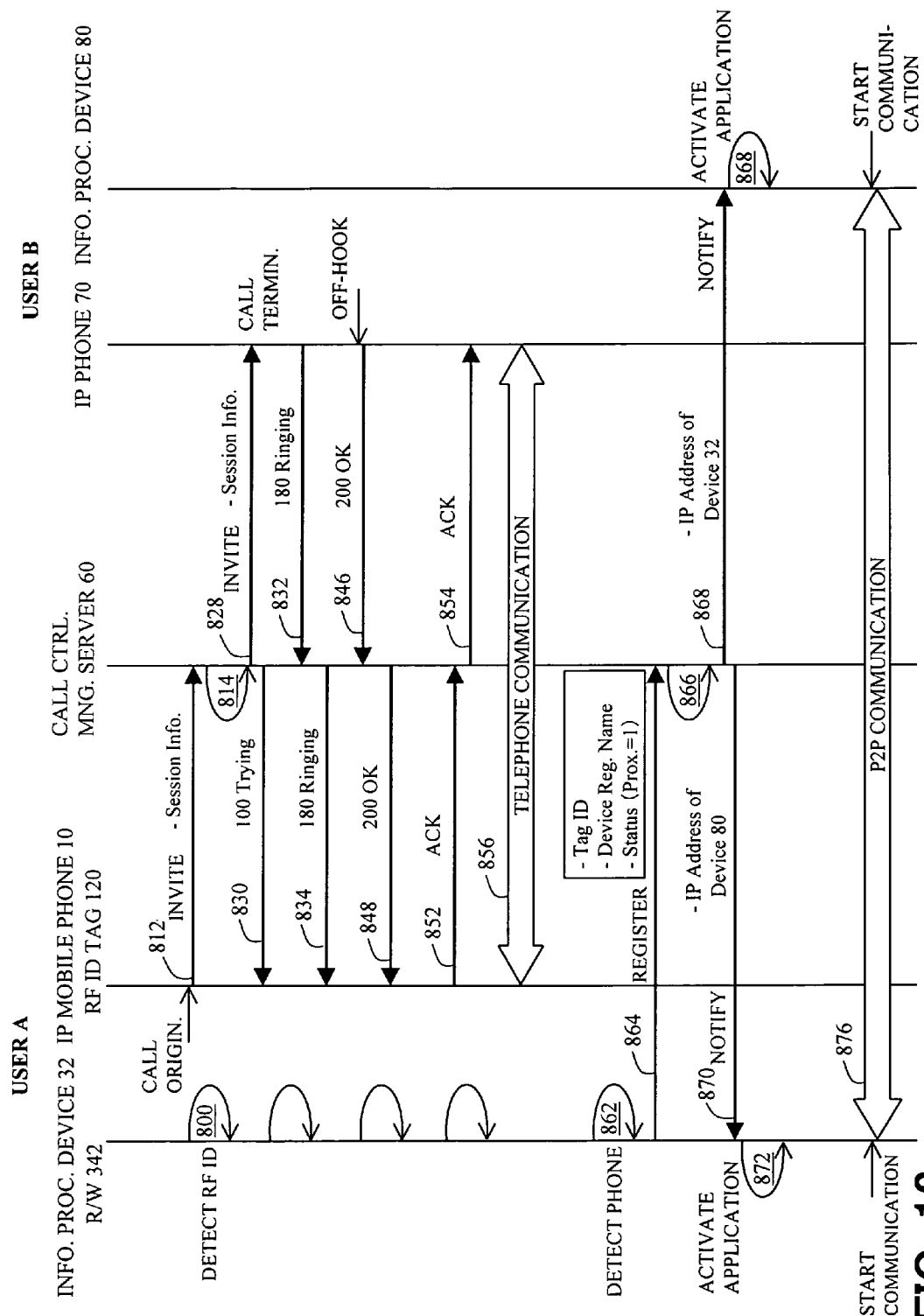
FIG. 13 shows a communication procedure for the IP mobile telephone carried and operated by the user in the first area 1, or in the second area 2 to which it has moved, to call the IP telephone in the area 3 over the IP network for establishing a call session, as shown in the configuration of FIG. 1, and then cause the information processing device in the second area 2 to which the user has moved, to connect itself to the information processing device in the area 3.

FIG. 13 shows a communication procedure for the IP mobile telephone 10 carried and operated by the user A in the first area 1, or in the second area 2 to which it has moved, to call the IP telephone 70 in the area 3 over the IP network 5 for establishing a call session, as shown in the configuration of FIG. 1, and then cause the information processing device 32 in the second area 2 to which the user A has moved, to connect itself to the information processing device 80 in the area 3.

Processes 812-834 and 846-856 are similar to those of the FIG. 11 or 12. In process 856, the IP mobile telephone 10 in the area 1 or 2 establishes a telephone call session with the IP telephone 70 over the IP network to enter into the status of telephone communication.

In process 800, the reader/writer device 342 of the information processing device 32 in the area 2 repeats detection of an RF ID tag in accordance with the operation by the user A in the area 2. If the IP mobile telephone approaches the information processing device 34, then in process 862 similarly to process 750 of FIG. 9, the reader/writer device 342 reads the tag ID of the RF ID tag 120 of the IP mobile telephone 10, and the processor 302 of the information processing device 32 stores the read tag ID and the proximity flag value "1" in the storage device 303. In process 864 similarly to process 752 of FIG. 9, the information processing device 32 (the processor 302) sends, to the call control and management server 60, the SIP message of "REGISTER" including the tag ID of the IP mobile telephone 10, the registered name of the information processing device 32, and the status flag value (=1).

In process 866, the call control and management server 60 (the processor 62) sets the value "1" to the proximity flag in the entry in the registration table of the storage device 63 that associates the registered name of the information processing device 32 with the registered name of the IP mobile telephone 10. Similarly to process 836 of FIG. 11, the call control and management server 60 (the processor 62) further searches the registration table of FIG. 10 and determines the information processing device 32 in the area 2 which has the proximity flag value "1" and is associated with the IP mobile telephone 10, and determines the information processing device 80 which has the proximity flag value of "1" and is associated with the IP telephone 70. In processes 868 and 870 similarly to processes 838 and 842 of FIG. 11, the call control and management server 60 (the processor 62) sends SIP messages of "NOTIFY" to the determined information processing devices 32 and 80 using their respective IP addresses as destinations. In process 868, the information processing device 80 (the processor 302) activates the P2P communication application. In process 872, the information processing device 32 (the processor 302) activates the P2P communication application. In process 876, the information processing devices 32 and 80 start the P2P communication over the P2P communication applications in response to the users' operations. One of the information processing devices 80 and 32 sends a data file of image information or the like for data sharing to the P2P application in the other of the information processing devices 80 or 32 using its IP address as a destination.

Figure 14:
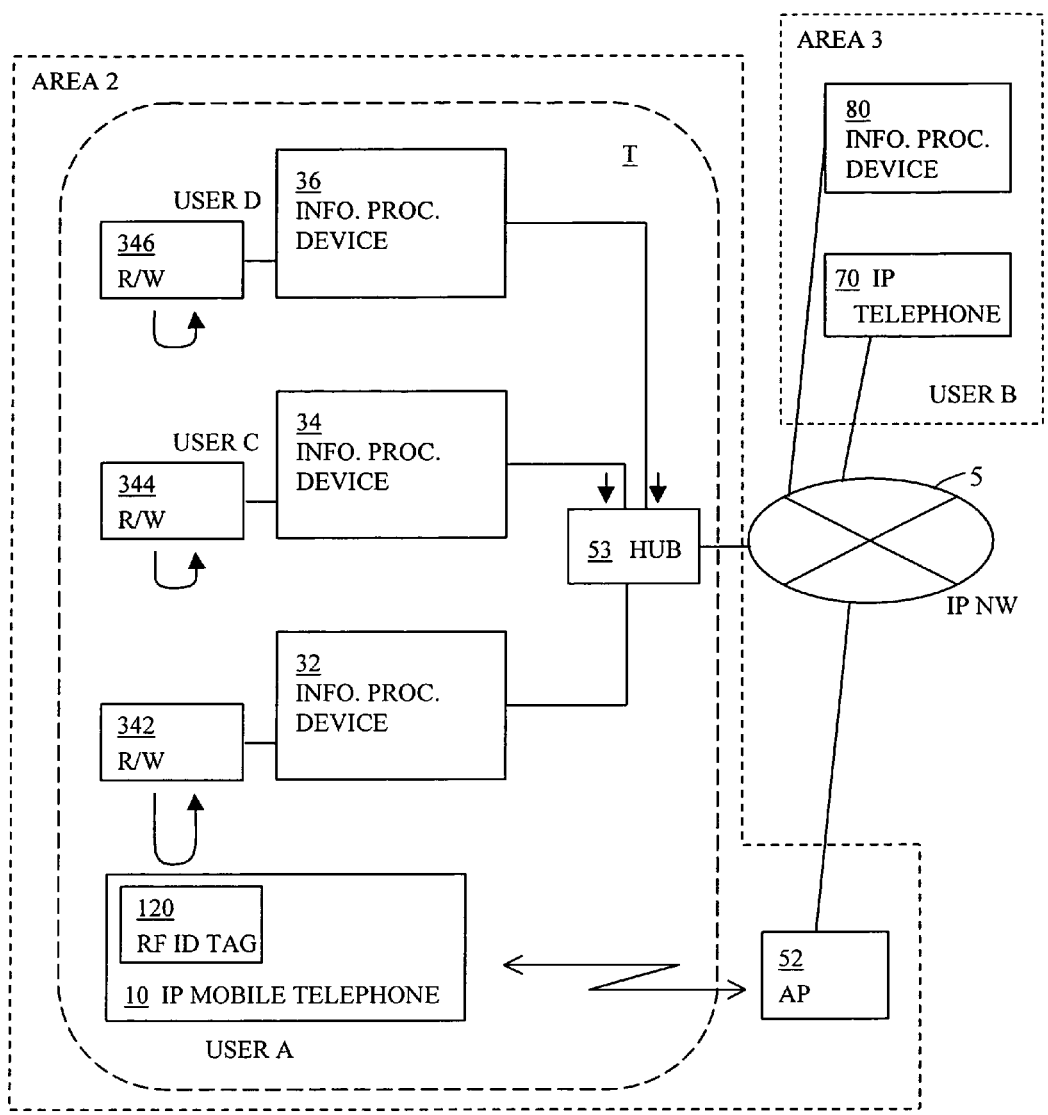
FIG. 14 shows arrangement of the IP mobile telephone which is connected to the IP network via the access point disposed in the area 2, and the information processing devices and a further information processing device which are connected to the IP network via a hub and placed on a conference table in the area 2, in accordance with a still further embodiment of the invention.

FIG. 14 shows arrangement of the IP mobile telephone 10 which is connected to the IP network 5 via the access point 52 disposed in the area 2, and the information processing devices 32 and 34 and a further information processing device 36 which are connected to the IP network 5 via a hub 53 and placed on a conference table T in the area 2, in accordance with a still further embodiment of the invention. The information processing device 36 has a configuration similar to that of each of the information processing devices 30 and 32, and has a reader/writer device 346.

While the telephone call session is established between the IP mobile telephone 10 and the IP telephone 70 and the P2P communication session is also established between the information processing devices 32 and 80, the information processing devices 34 and 36 of the users C and D are connected to the hub 53 which is connected to the IP network 5 and thereby approach the IP mobile telephone 10. Thus the multi-party P2P communication becomes available among the information processing devices 32, 34, 36 and 80.

Figure 15:
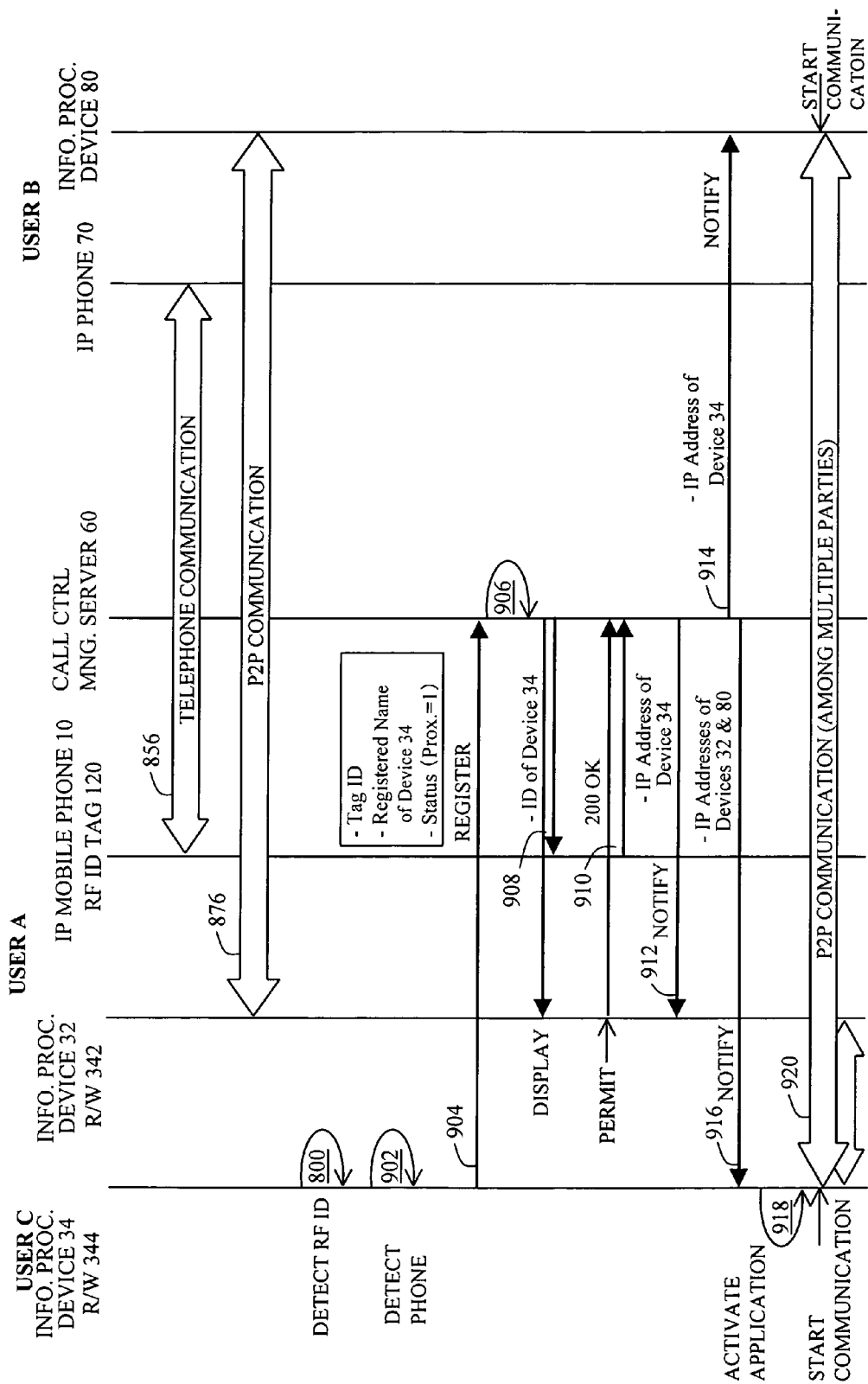
FIG. 15 shows a communication procedure for the information processing device of a user C to establish a multi-party P2P communication session with the other information processing devices in the configuration of FIG. 1, which procedure occurs after the establishment of the telephone communication session between the IP mobile telephone and the IP telephone and the establishment of the P2P communication session between the information processing devices associated with the two respective telephones in accordance with either one of the procedures of FIGS. 11 to 13.

FIG. 15 shows a communication procedure for the information processing device 34 of the user C to establish a multi-party P2P communication session with the other information processing devices 32 and 80 in the configuration of FIG. 1, which procedure occurs after the establishment of the telephone communication session 856 between the IP mobile telephone 10 of the user A and the IP telephone 70 of the user B and the establishment of the P2P communication session 876 between the information processing devices 32 and 80 associated with the two respective telephones in accordance with either one of the procedures of FIGS. 11 to 13.

In process 902 similarly to process 862 of FIG. 13, the reader/writer device 344 of the information processing device 34 reads the tag ID of the RF ID tag 120 of the IP mobile telephone 10, and the processor 302 of the information processing device 34 stores the read tag ID and the proximity flag value "1" in the storage device 303. In process 904 similarly to process 864 of FIG. 13, the information processing device 34 (the processor 302) sends, to the call control and management server 60, the SIP message of "REGISTER" including the tag ID of the IP mobile telephone 10, the registered name of the information processing device 34, and the status flag value (=1).

In process 906 similarly to process 866 of FIG. 13, the call control and management server 60 (the processor 62) sets the value "1" to the proximity flag in the entry in the registration table of the storage device 63 that associates the registered name of the information processing device 34 in the area 2 with the registered name of the IP mobile telephone 10. The call control and management server 60 (the processor 62) further searches the registration table, and determines the information processing device 32 which is in the established status of the P2P communication session with the information processing device 80 and which has the proximity flag value "1" and is associated with the IP mobile telephone 10, the information processing device 80 which is in the established status of the P2P communication session with the information processing device 32 and which has the proximity flag value "1" and is associated with the IP telephone 70, and the information processing device 34 which has the proximity flag value "1" and is associated with the IP mobile telephone 10. In process 908, the call control and management server 60 (the processor 62) sends the registered name of the information processing device 34 as an identification to the information processing device 32 associated with the IP mobile telephone 10 or to the IP mobile telephone 10. The information processing device 32 (the processor 302) displays the registered name of the information processing device 34 on the display device 304 of the information processing device 32, or alternatively the IP mobile telephone 10 (the processor 102) displays the registered name of the information processing device 34 on the display device 1042 of the IP mobile telephone 10. The user A operates the input device 306 of the information processing device 32 or the keys 105 of the IP mobile telephone 10 to permit the information processing device 34 to participate in the established P2P communication 876. In process 910, the information processing device 32 (the processor 302) or the IP mobile telephone 10 (the processor 102) sends the SIP message of "200 OK" indicating permission to the call control and management server 60. In response to the permission, the call control and management server 60 (the processor 62) in processes 912 and 914 sends, to the information processing devices 32 and 80, SIP messages of "NOTIFY" containing the IP address of the additional information processing device 34 to communicate with, and in process 916 sends, to the additional information processing device 34, a SIP message of "NOTIFY" containing the IP addresses of the information processing devices 32 and 80 to communicate with.

In process 918, the information processing device 34 activates the P2P communication application. In process 920, the information processing device 34 (the processor 302) starts the P2P communication over the P2P application in response to operation by the user C, and sends and receives the data files of image information or the like to and from the other information processing device 32 or 80. Thus, in process 920, the multi-party P2P communication is performed among the information processing devices 32, 34 and 80. In this case, the user C together with the user A uses the IP mobile telephone 10 in a shared mode of operation to perform the telephone communication with the user B.

The information processing device 36 of the user D in FIG. 14 also may participate in the multi-party P2P communication 920. In this case, the user D together with the users A and C uses the IP mobile telephone 10 in the shared mode of operation to perform the telephone communication with the user B.

FIG. 16 shows an example of the registration table stored in the storage device 63 of the call control and management server 60 when the information processing devices 34 and 36 of the users C and D which are located near the IP mobile telephone 10 are additionally registered in the area 2 of FIG. 14. In this case, the additional registered names of the information processing devices of the users C and D, which have the proximity flag value "1" and are associated with the registered name of the IP mobile telephone 10, are registered in additional entries (004 and 005).

FIGS. 17A, 17B, 17C and 17D show examples of display screens of statuses of users' telephones and associated information processing devices in the registration table, which screens are used for establishing a telephone call session between the IP mobile telephone 10 in the area 2 and the IP telephone 70 in the area 3 in FIG. 14, and also for establishing a P2P communication session for data sharing between the information processing devices 32, 34 and 36 in the area 2 and the information processing device 80 in the area 3, in accordance with the procedure of FIG. 12.

In response to the operation by the user A for checking the status of the information processing device 32, the call control and management server 60 causes the display screen of FIG. 17A to be displayed on the display device 304 of the information processing device 32 in accordance with the registration table of FIG. 16. In FIG. 17A, the IP mobile telephone 10 of the user A (the registered name of the user A's own telephone: "IP-Phn1") and the IP telephone 70 of the user B (the registered name: "IP-Phn2") are in the released statuses. In the display screen of FIG. 17A, the user A places the cursor (arrow cursor) and clicks on the registered name "IP-Phn2" of the IP telephone 70 of the user B on the display device 304 of the information processing device 32 as shown in FIG. 17B. Then the service menu M1 is displayed as shown in FIG. 17B. When the user A places the cursor on an indication of "View Registered Devices" and clicks on it for selection, the display screen of FIG. 17C is newly displayed.

FIG. 17C shows a display screen of a list of the registered names and statuses of the registered information processing devices of the users B, F and G that are associated with the IP telephone 70 of the user B. The session status of the registered information processing device (Dpc1) of the user B remains released, and the session statuses of the registered information processing devices (Dpc5, Dpc6) of the other users F and G near the IP mobile telephone 10 also remain released. When the user A places the cursor (arrow cursor) and clicks on the registered name "Dpc 1" of the information processing device 80 of the user B, as shown in FIG. 17C, on the display device 304 of the information processing device 32, a service menu M2 is displayed as shown in FIG. 17C. When the user A places the cursor and clicks on "Call & Data Sharing 2" in the menu M2, the IP mobile telephone 10 originates a call to the IP telephone 70 to establish the telephone call session, and to establish the P2P communication session between the information processing devices 32 and 80 (Npc70 and Dpc1). Thus the list of FIG. 17D is displayed. In FIG. 17D, the session status of the registered name "Dpc1" of the information processing device 32 of the user B is changed into an established status.

Further, on the information processing device 34, the user C selects "Data Sharing 1" in the menu M2 for the registered name "Npc70" of the information processing device 32 of the user A from the list of the statuses of the other devices in proximity on the display screen similar to that of the FIG. 17C, to thereby perform processes 904 to 916 of the FIG. 15 to connect the information processing device 34 to the information processing devices 32 and 80. In the information processing device 36, the user D selects "Data Sharing 1" in the menu M2 for the registered name "Npc70" of the information processing device 32 of the user A from the list of the statuses of the other devices in proximity on the display screen similar to that of the FIG. 17C, to thereby perform processes 904 to 916 of the FIG. 15 to connect the information processing device 36 to the information processing devices 32, 34 and 80. Thus the multi-party P2P communication session is established among the information processing devices 32, 34 and 36 in the area 2 and the information processing device 70 in the area 3.

FIGS. 18A, 18B and 18C show examples of the display screens of statuses of users' telephones and information processing devices in the registration table of the call control and management server 60, which is retrieved by the user B on the information processing device 80 according to the procedure of FIG. 18B, when the other information processing devices 34 and 36 of the users C and D are located near the IP mobile telephone 10 in the area 2 of FIG. 14.

In FIG. 18A, the registered name "IP-Phn2" of the IP telephone 70 of the user B and the registered name "IP-Phn1" of the IP mobile telephone 10 of the user A have released statuses. On the display screen of FIG. 18A, the user B places the cursor (arrow cursor) and clicks on the registered name "IP-Phn1" of the mobile telephone 10 of the user A, in the information processing device 80. Then the service menu M5 is displayed as shown in FIG. 18B. When the user B places the cursor on the indication of "View Registered Devices" and clicks on it for selection, the display screen of FIG. 18C is displayed. FIG. 18C shows a list of the registered names and the session statuses of the information processing devices 32, 34 and 36 of the registered users A, C and D associated with the IP mobile telephone 10 of the user A. The session status of the registered information processing device 32 of the user A remain released, and the session statuses of the registered information processing devices (NpcLX, Npc50) of the other users C and D which are located near the IP mobile telephone 10 also remain released.

FIGS. 19A, 19B and 19C show other examples of the display screens of statuses of users' telephones and information processing devices in the registration table, which screens are used for establishing a telephone call session between the IP mobile telephone 10 in the area 2 and the IP telephone 70 in the area 3 in FIG. 14, and also for establishing the P2P communication session between the information processing devices 32, 34 and 36 in the area 2 and the information processing device 70 in the area 3, in accordance with the procedure of FIG. 12. In this case, in FIG. 12, the position of the IP mobile telephone 10 of the user A and the position of the IP telephone 70 of the user B are interchanged with each other, and the position of the information processing device 30 of the user A and the position of the information processing device 80 of the user B are interchanged with each other.

FIG. 19A is similar to FIG. 18A. FIG. 19B is also similar to FIG. 18B. When the user B places the cursor on the indication of "Call & Data Sharing 2" in the menu M2 and clicks on it for selection, the IP telephone 70 of the user B originates a call to the IP mobile telephone 10 to establish a telephone communication session, and further to establish a P2P communication session among the information processing device 80 and the information processing devices 32, 34 and 36 (registered names: "WSpc", "NpcLX" and "Npc50") of the users A, C and D which devices are located near the IP mobile telephone 10 and hence associated with the IP mobile telephone 10. Thus the display screen of FIG. 19C is displayed. In FIG. 19C, the session status of the registered information processing device (Npc70) of the user A is changed into the established status, and the session statuses of the information processing devices 34 and 36 (registered names: "Npc" and "Npc50") of the users C and D are changed into the established statuses.

Figures 20A, 20B:
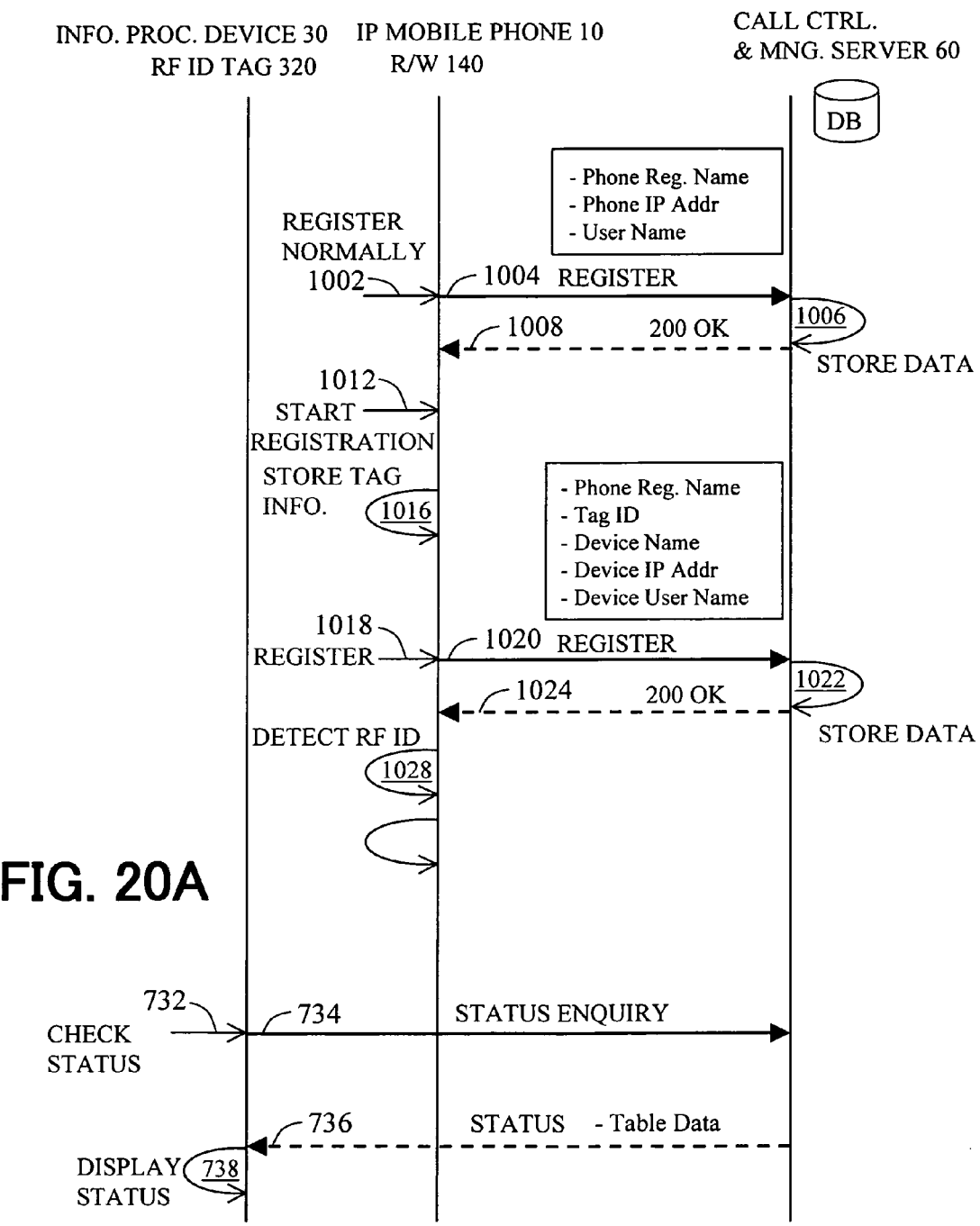
FIG. 20A shows a communication procedure for the IP mobile telephone and the information processing device 5 shown in FIG. 2 to communicate and register themselves with the call control and management server.
FIG. 20B shows a procedure for the information processing device shown in FIG. 2 to communicate with the call control and management server to enquire session statuses of the registered telephones and the information processing devices.

FIG. 20A shows a communication procedure for the IP mobile telephone 10 and the information processing device 30 shown in FIG. 2 to communicate and register themselves with the call control and management server 60.

In process 1002, the user A activates the registration application on the IP mobile telephone 10 to initiate registration of the IP mobile telephone 10, and operates the keys 105 to input the registered name and the user name of the IP mobile telephone 10. In process 1004, the IP mobile telephone 10 (the processor 102) sends, to the call control and management server 60, a SIP message of "REGISTER" in the text format including registration items in the IP packet. The message contains "REGISTER" in the request line, predetermined control information in the header filed (e.g., SIP URI "sip:IP-Phn1@10.10.10.1" containing the registered name (telephone device name) and the IP address in the "From" header and the "To" header), and the tag ID of the RF ID tag 320, the registered name, the IP address and the user name "A" of the information processing device 30 in the body.

In process 1006, the call control and management server 60 (the processor 62) stores the registered name (telephone device name), the IP address and the user name of the IP mobile telephone 10 in the registration table or database of the storage device 63.

In process 1008, the call control and management server 60 (the processor 62) sends back the SIP response message of "200 OK" in the IP packet to the IP mobile telephone 10. The SIP response message contains "200 OK" in the response line, the predetermined control information in the header field (e.g., SIP URI "sip:IP-Phn1@10.10.10.1" containing the registered name and the IP address in the "From" header and the "To" header) and arbitrary information in the body.

In process 1012, the user A activates the registration application (in the storage device 103) of the IP mobile telephone 10 to initiate registration of the information processing device 30. In process 1016, the IP mobile telephone 10 (the processor 102) causes the reader/writer device 140 to read tag information including the tag ID of the RF ID tag 320 and stores the information in the storage device 103.

In process 1018, the user A operates the keys 105 of the IP mobile telephone 10 to input the registered name of the IP mobile telephone 10, and the registered name, the current IP address and the user name of the information processing device 30 and then to initiate registration of the information processing device 30. In process 1020, the IP mobile telephone 10 (the processor 102) sends, to the call control and management server 60, a SIP message of "REGISTER" in the text format including registration items in the IP packet. The message contains "REGISTER" in the request line, predetermined control information in the header filed (e.g., SIP URI "sip:IP-Phn1@10.10.10.1" containing the registered name (telephone device name) and the IP address in the "From" header and the "To" header), and the tag ID of the RF ID tag 320, and the registered name, the IP address and the user name "A" of the information processing device 30 in the body.

In process 1022, the call control and management server 60 (the processor 62) stores the tag ID, the registered name, the IP address and the user name of the information processing device 30 in the registration table of the storage device 63.

In process 1024, the call control and management server 60 (the processor 62) sends a SIP response message of "200 OK" in the IP packet back to the mobile telephone device 10. The message contains "200 OK" in the response line, the predetermined control information in the header field (e.g., SIP URI "sip:IP-Phn1@10.10.10.1" containing the registered name and the IP address in the "From" header and the "To" header) and arbitrary information in the body. After that, in process 1028, the reader/writer device 140 repeats detection of an RF ID tag.

FIG. 20B shows a procedure for the information processing device 30 shown in FIG. 2 to communicate with the call control and management server 60 to enquire session statuses of the registered telephones and the information processing devices. Processes 734 to 738 are similar to those of FIG. 8B.

Figure 21A:
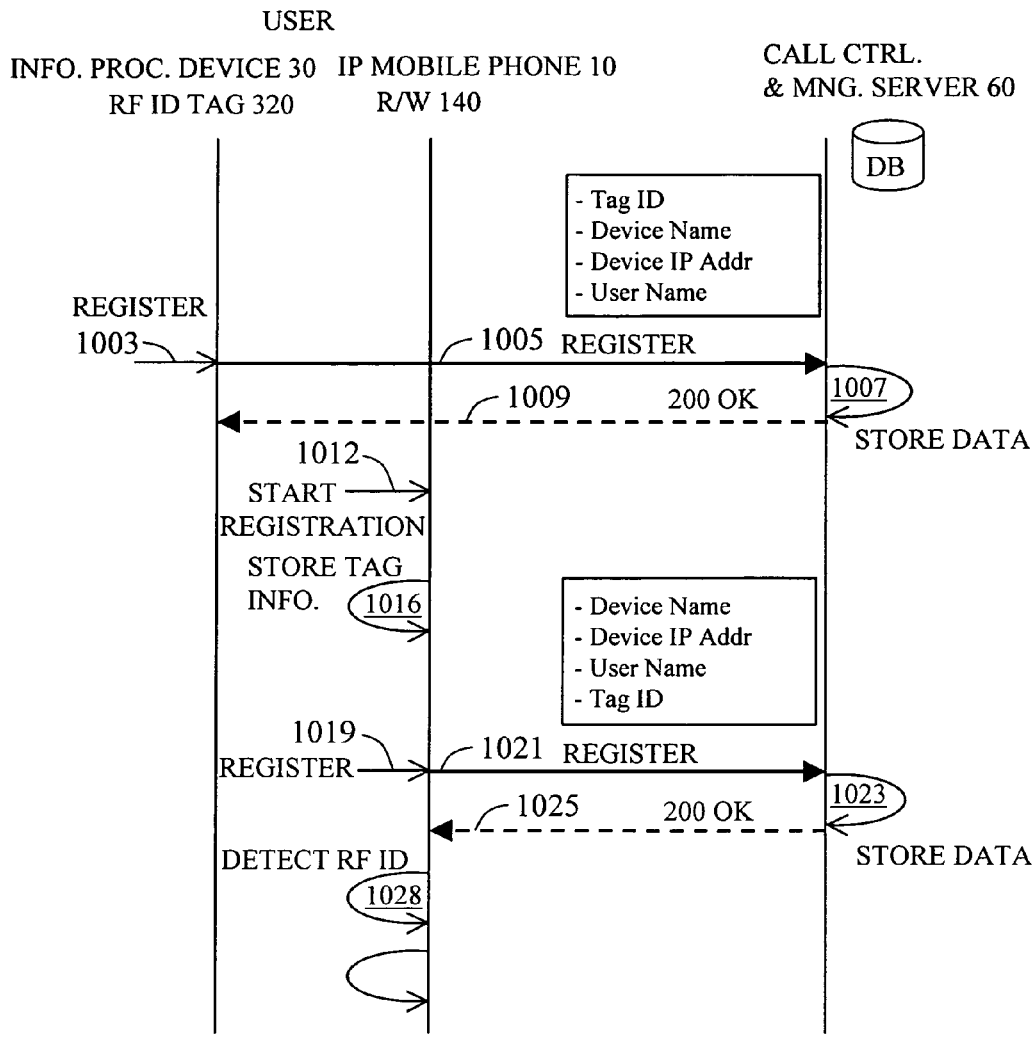
FIG. 21A shows another communication procedure for the IP mobile telephone and the information processing device of FIG. 2 to communicate and register themselves with the call control and management server.

FIG. 21A shows another communication procedure for the IP mobile telephone 10 and the information processing device 30 of FIG. 2 to communicate and register themselves with the call control and management server 60.

In process 1003, the user A activates the registration application on the information processing device 30 to initiate registration of the information processing device 30, and operates the input device 306 to input the registered name and the user name of the information processing device 30. In process 1005, the information processing device 30 (the processor 302) sends, to the call control and management server 60, a SIP message of "REGISTER" in the text format including registration items in the IP packet. The message contains "REGISTER" in the request line, predetermined control information in the header filed (e.g., SIP URI "sip: Wspc@10.10.20.2" containing the registered name (telephone device name) and the IP address in the "From" header and the "To" header), and the tag ID of RF ID tag 320 and the user name "A" of in the body.

In process 1007, the call control and management server 60 (the processor 62) stores the tag ID, the registered name (information processing device name), the IP address and the user name of the information processing device 30 in the registration table or database of the storage device 63.

In process 1009, the call control and management server 60 (the processor 62) sends a SIP response message of "200 OK" in the IP packet back to the information processing device 30. The SIP response message contains "200 OK" in the response line, the predetermined control information in the header field (e.g., SIP URI "sip:WSpc@10.10.20.2 containing the registered name and the IP address in the "From" header and the "To" header) and arbitrary information in the body.

In process 1012, the user A activates the registration application (in the storage device 103) on the IP mobile telephone 10 to initiate registration of the information processing device 30. In process 1016, the IP mobile telephone 10 (the processor 102) causes the reader/writer device 140 to read tag information including the tag ID of the RF ID tag 320 of the information processing device 30, and stores the read information in the storage device 103.

In process 1019, the user A operates the keys 105 of the IP mobile telephone 10 to input the registered name and the user name of the IP mobile telephone 10 and then to initiate registration of the IP mobile telephone 10 with the call control and management server 60. In process 1021, the IP mobile telephone 10 (the processor 102) sends, to the call control and management server 60, a SIP message of "REGISTER" in the text format including registration items in the IP packet. The message contains "REGISTER" in the request line, predetermined control information in the header filed (e.g., SIP URI "sip:IP-Phn1@10.10.10.1" containing the registered name (telephone device name) and the IP address in the "From" header and the "To" header), and the registered name, the IP address and the user name "A" of the IP mobile telephone 10, and the tag ID of the RF ID tag 320 of the information processing device 30 in the body.

In process 1023, the call control and management server 60 (the processor 62) stores the tag ID of the information processing device 30, the registered name, the IP address and the user name of the IP mobile telephone 10 in the registration table of the storage device 63.

In process 1025, the call control and management server 60 (the processor 62) sends a SIP response message of "200 OK" in the IP packet back to the mobile telephone device 10. The SIP message contains "200 OK" in the response line, the predetermined control information in the header field (e.g., SIP URI "sip:IP-Phn1@10.10.10.1" containing the registered name and the IP address in the "From" header and the "To" header), and arbitrary information in the body. After that, in process 1028, the reader/writer device 140 repeats detection of an RF ID tag.

Figure 22:
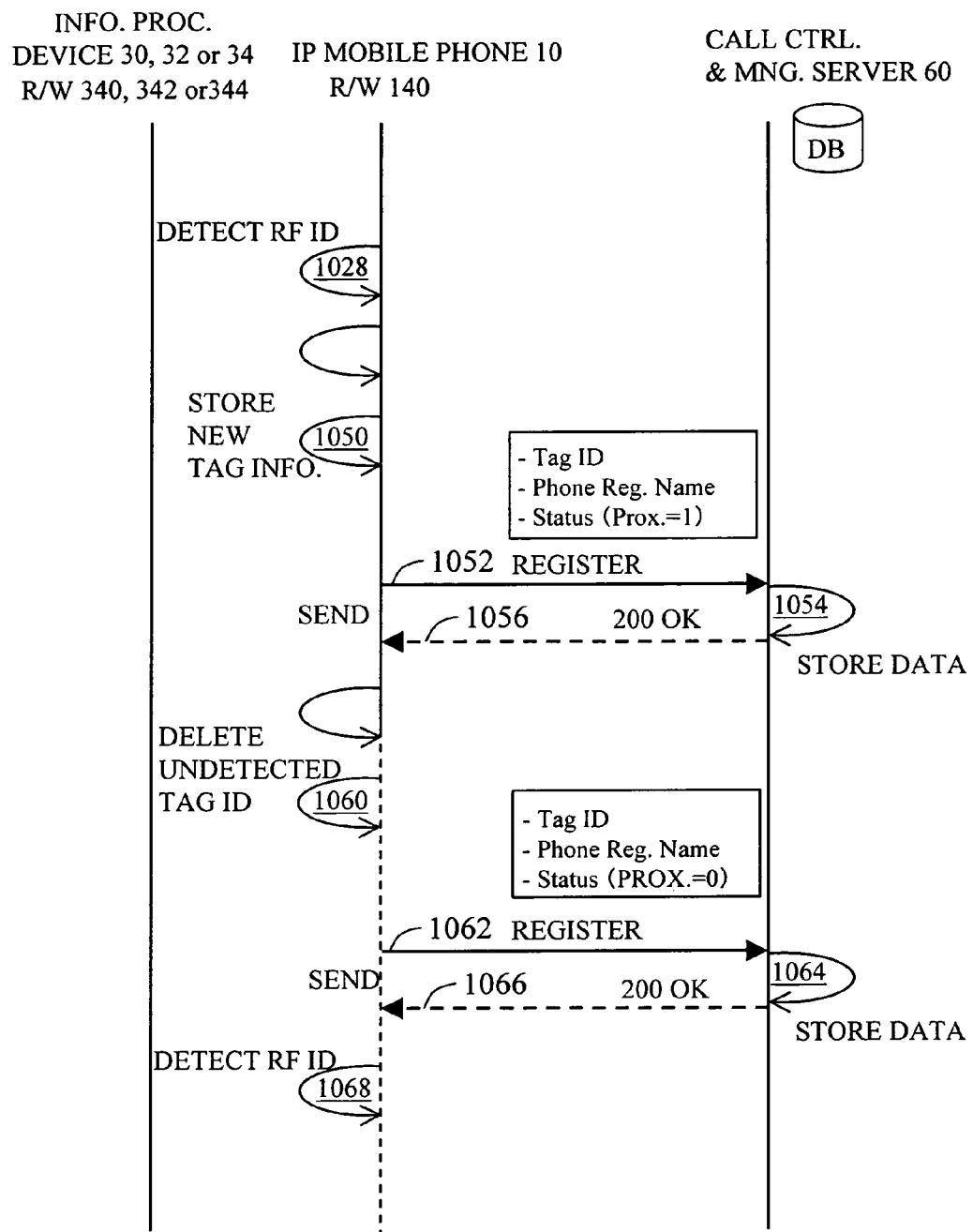
FIG. 22 shows a procedure for the IP mobile telephone of FIG. 2 to update data of the information processing device stored in the call control and management server.

FIG. 22 shows a procedure for the IP mobile telephone 10 of FIG. 2 to update data of the information processing device 30, 32 or 34 stored in the call control and management server 60.

In process 1028, the user A operates the IP mobile telephone 10 to cause the reader/writer device 140 to start cyclic detection of an RF ID tag. For example, if the information processing device 30 approaches the reader/writer device 320, then the reader/writer device 140 in process 1050 reads the tag ID of the RF ID tag 320 of the information processing device 30, and the processor 102 of the IP mobile telephone 10 stores the read tag ID and the proximity flag value "1" in the storage device 103. In this case, the proximity flag indicates whether or not the information processing device 30 associated with the tag ID is located near the IP mobile telephone 10. In process 1052, the IP mobile telephone 10 (the processor 102) sends, to the call control and management server 60, the tag ID of the information processing device 30, and the SIP message of "REGISTER" including the registered name and the status flag value (=1) of the IP mobile telephone 10.

In process 1054, the call control and management server 60 (the processor 62) receives the SIP message of "REGISTER" and sets or updates to the value "1" the proximity flag of the registered name of the information processing device 30 which is associated with the registered name of the IP mobile telephone 10 and has the tag ID in the registration table. When the registered name of the information processing device 30 is not associated with the registered name of the IP mobile telephone 10, such update is not performed. Alternatively, when the registered name of the information processing device 30 is not associated with the registered name of the IP mobile telephone 10, only if the there is another entry for associating the registered name of the information processing device 30 with a registered name of another IP telephone, the call control and management server 60 (the processor 62) may look into the other entry, generate and add to the registration table an entry for associating the registered name of the information processing device 30 with the registered name of the IP mobile telephone 10, store the tag ID, and then set the value "1" to its proximity flag. In process 1056, the call control and management server 60 (the processor 62) sends a SIP response message of "200 OK" back to the IP mobile telephone 10.

After that, when the information processing device moves away from the IP mobile telephone 10, the reader/writer device 140 in process 1060 fails to read the RF ID tag 324 of the information processing device 30 and the processor 102 of the IP mobile telephone 10 stores, in the storage device 103, the proximity flag value "0" for the tag ID of the RF ID tag 320. In process 1062, the IP mobile telephone 10 (the processor 102) sends, to the call control and management server 60, a SIP message of "REGISTER" including the tag ID of the information processing device 30, the registered name of the IP mobile telephone 10 and the status flag value (=0).

In process 1064, the call control and management server 60 (the processor 62) receives the SIP message of "REGISTER" and updates the proximity flag value to "0" in the entry for associating the registered name of the IP mobile telephone 10 with the registered name of the information processing device 30 having the tag ID in the registration table of the storage device 63. When the user name of the information processing device is different from that of the IP mobile telephone or the IP telephone in an entry which has the proximity value of "0", the call control and management server 60 (the processor 62) may delete that entry. In process 1066, the call control and management server 60 (the processor 62) sends a SIP response message of "200 OK" back to the IP mobile telephone 10. In process 1068, the reader/writer device 140 of the IP mobile telephone 10 continues cyclic detection of an RF ID tag.

Figure 23:
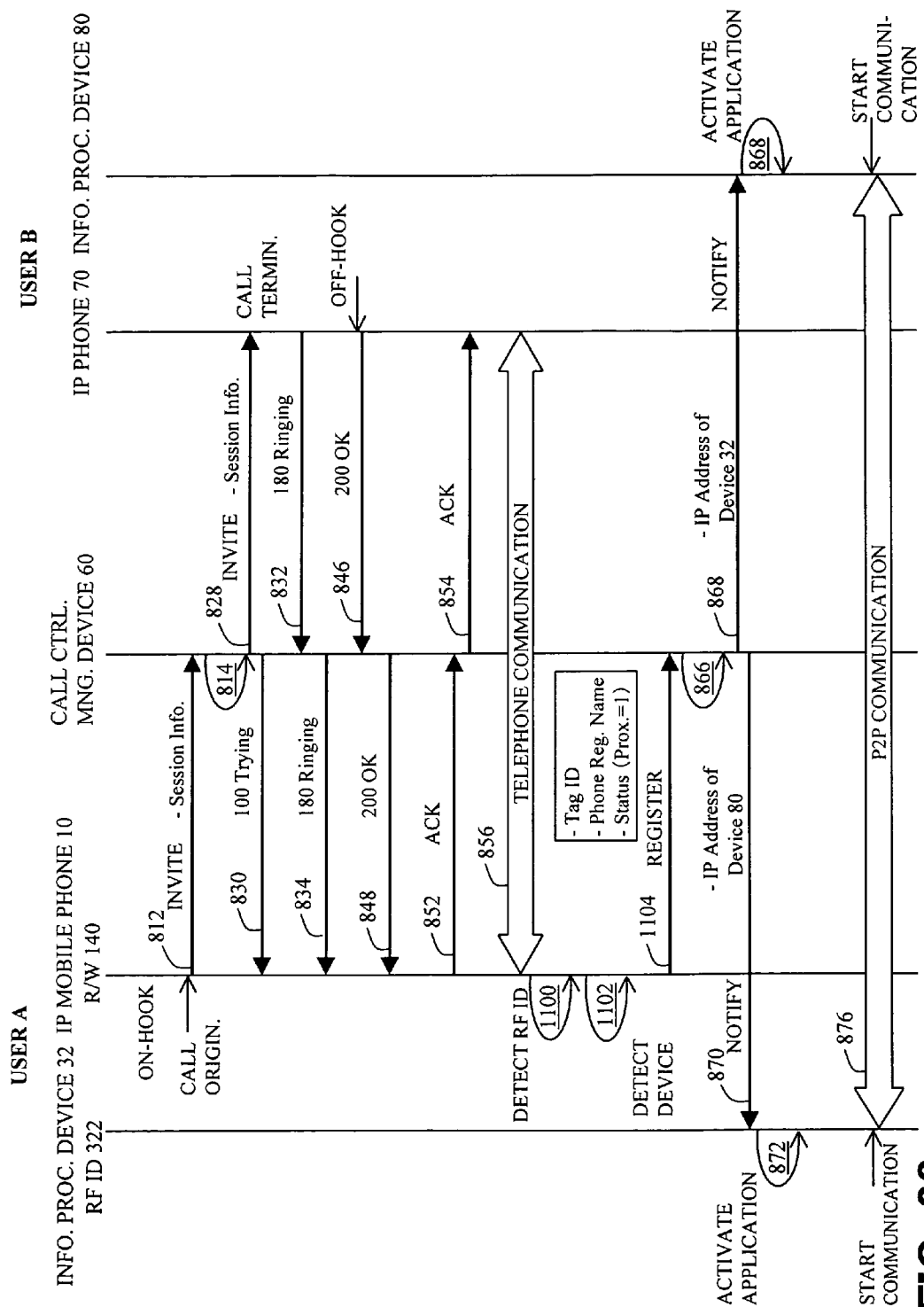
FIG. 23 shows a communication procedure for the IP mobile telephone carried and operated by the user A in the first area 1, or in the second area 2 to which it has moved, to call the IP telephone in the area 3 over the IP network for establishing a telephone call session, as shown in the configuration of FIG. 2, and then cause the information processing device in the second area 2 to which the user A has moved, to connect itself to the information processing device in the area 3.

FIG. 23 shows a communication procedure for the IP mobile telephone 10 carried and operated by the user A in the first area 1, or in the second area 2 to which it has moved, to call the IP telephone 70 in the area 3 over the IP network 5 for establishing a telephone call session, as shown in the configuration of FIG. 2, and then cause the information processing device 32 in the second area 2 to which the user A has moved, to connect itself to the information processing device 80 in the area 3.

Processes 812 to 834 and 846 to 856 are similar to those of FIG. 13.

In process 1100, the reader/writer device 140 of the IP mobile telephone 10 repeats detection of an RF ID tag. When the IP mobile telephone 10 approaches the information processing device 32 in the area 2, the reader/writer device 140, in process 1102 similarly to process 1050 of FIG. 22, reads the tag ID of the RF ID tag 322 of the information processing device 32, and the processor 102 of the IP mobile telephone 10 stores the read tag ID and a proximity flag value "1" in the storage device 103. In process 1104 similarly to process 1052 of FIG. 22, the information processing device 32 (the processor 302) sends, to the call control and management server 60, a SIP message of "REGISTER" including the tag ID of the information processing device 32, the registered name of the IP mobile telephone 10, and the status flag value (=1).

Processes 866 to 872 and 876 are similar to those of FIG. 13.

Figure 24:
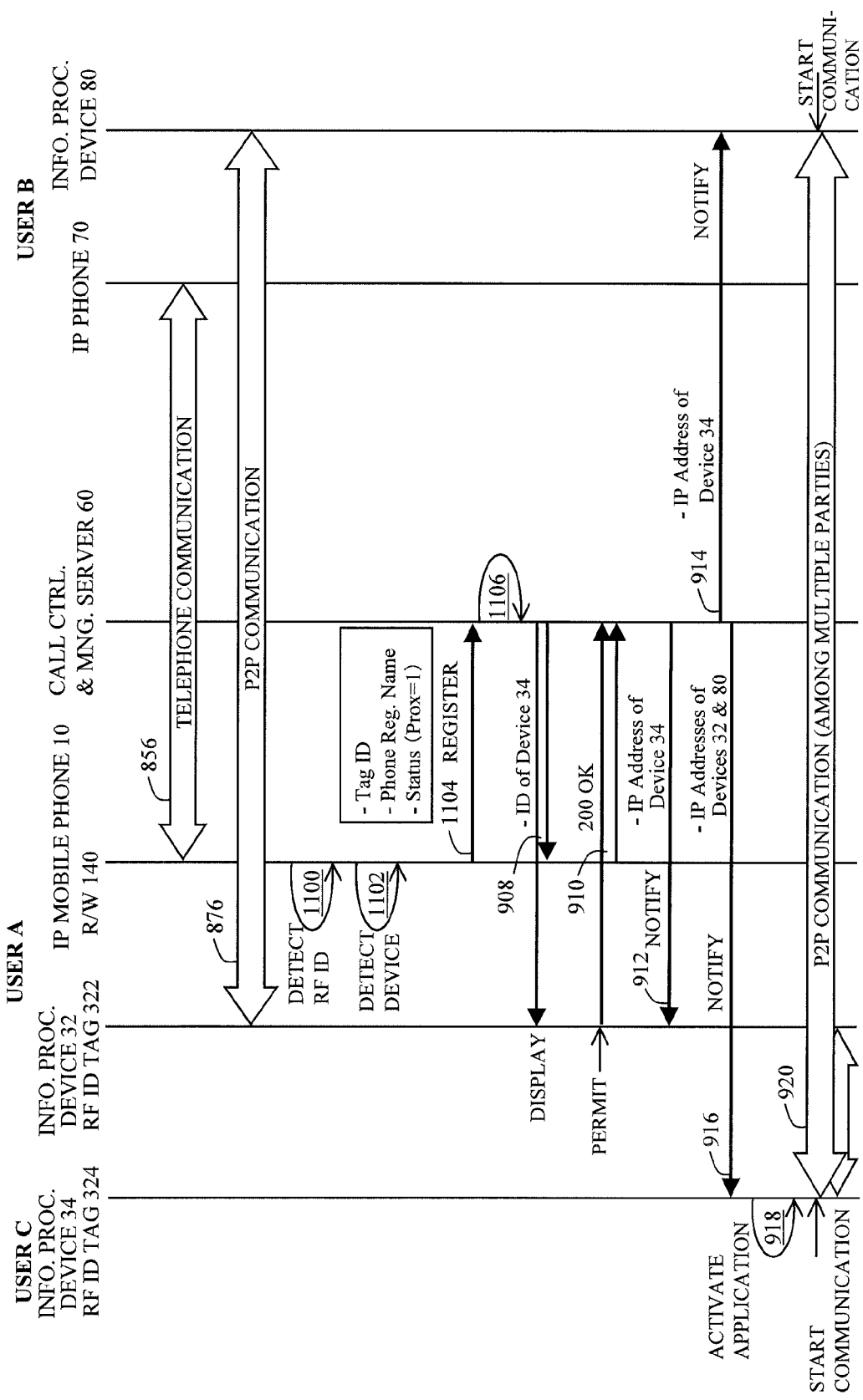
FIG. 24 shows a communication procedure for the information processing device of the user C to establish a multi-party P2P communication session with the other information processing devices in the configuration of FIG. 2, which procedure occurs after the establishment of the telephone communication session between the IP mobile telephone of the user A and the IP telephone of the user B and the establishment of the P2P communication session between the information processing devices associated with the two respective telephones in accordance with either one of the procedures of FIGS. 11, 12 and 22.

FIG. 24 shows a communication procedure for the information processing device 34 of the user C to establish a multi-party P2P communication session with the other information processing devices 32 and 80 in the configuration of FIG. 2, which procedure occurs after the establishment of the telephone communication session 856 between the IP mobile telephone 10 of the user A and the IP telephone 70 of the user B and the establishment of the P2P communication session 876 between the information processing devices 32 and 80 associated with the two respective telephones in accordance with either one of the procedures of FIGS. 11, 12 and 22.

Processes 1100 to 1104 are similar to those of FIG. 23. In process 1104, the IP mobile telephone 10 sends, to the call control and management server 60, a SIP message of "REGISTER" including the tag ID of the information processing device 34, the registered name of the IP mobile telephone 10, and the status flag value (=1). In process 1106 similarly to process 906 of FIG. 15, the call control and management server 60 (the processor 62) sets, in the registration table, the value "1" to the proximity flag in the entry for associating the registered name of the information processing device 34 in the area 2 with the registered name of the IP mobile telephone 10. The call control and management server 60 (the processor 62) further searches the registration table and determines the information processing device 32 which maintains the established status of the P2P communication session with the information processing device 80 and which has the proximity flag value "1" and is associated with the IP mobile telephone 10, the information processing device 80 which maintains the established status of the P2P communication session with the information processing device 32 and which has the proximity flag value of "1" and is associated with the IP telephone 70, and the information processing device 34 which has the changed proximity flag value of "1" and is associated with the IP mobile telephone 10. Processes 908 to 920 are similar to those of FIG. 15.

In the configuration of FIG. 3, the IP mobile telephone 10, the IP telephone 70, the information processing devices 30, 32, 34 and 80 have both of the respective functions of those in FIGS. 1 and 2.

In the embodiments described above, the invention is applied to telephone communications made by the two users between the respective IP telephones. However, it is understood by those skilled in the art that the present invention is also applicable to interconnections to be established among information processing devices associated with three or more IP telephones in the three-party or conference telephone communications among three or more users.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. A system comprising:
    an information processing apparatus that controls and manage a call between devices;
    a first IP telephone that comprises at least one of a contactless information storage device and a contactless reader/writer device;
    a first information processing device that is configured to be operated by an end user and operable independently of an IP telephone, and comprises at least one of a contactless reader/writer device and a contactless information storage device;
    a second IP telephone; and
    a second information processing device that is configured to be operated by an end user and operable independently of an IP telephone, wherein the information processing apparatus the first IP telephone, the first information processing device, the second IP telephone, and the second information processing device are connectable to an IP network, wherein the information processing apparatus stores, as registration information, a first telephone identification and a first IP address of the first IP telephone, a first device identification and a second IP address of the first information processing device associated with the first IP telephone by a first association identification that is read by the contactless reader/writer device of the first information processing device or the first IP telephone from the contactless information storage device of the first IP telephone or the first information processing device, a second telephone identification and a third IP address of the second IP telephone, and a second device identification and a fourth IP address of the second information processing device associated with the second IP telephone, and in response to a request for establishment of a session received from the first IP telephone or the first information processing device, the information processing apparatus sends a request for establishment of a session between the first IP telephone and the second IP telephone, to the first IP address and the third IP address stored as the registration information, to establish a session between the first IP telephone and the second IP telephone, and notifies, in accordance with the registration information, one of the second IP address and the fourth IP address of corresponding one of the first and second information processing devices to the other information processing device at the IP address thereof, to dynamically establish a peer-to-peer session between the first information processing device and the second information processing device while the session between the first IP telephone and the second IP telephone is established or continues.

2. A system according to claim 1, wherein the first association identification is stored in the contactless information storage device of the first IP telephone, the first association identification is read by the contactless reader/writer device of the first information processing device, and the first information processing device sends the first association identification and the first device identification of the first information processing device to the information processing apparatus.

3. A system according to claim 1, wherein the first association identification is stored in the contactless information storage device of the first information processing device, the first association identification is read by the contactless reader/writer device of the first IP telephone, the first IP telephone sends the first association identification and the first telephone identification of the first IP telephone to the information processing apparatus.

4. A system according to claim 1, wherein the first IP telephone is an IP mobile telephone.

5. A system according to claim 1, wherein, if a request for establishment of a session between the first IP telephone and the second IP telephone is received from the first IP telephone or the first information processing device, the information processing apparatus, establishes a session between the first IP telephone and the second IP telephone, and then further establishes a session between the first information processing device and the second information processing device.

6. A system according to claim 1, wherein, if a request for establishment of a session between the first IP telephone and the second IP telephone is received from the first IP telephone or the first information processing device, the information processing apparatus, establishes a session between the first information processing device and the second information processing device, and then further establishes a session between the first IP telephone and the second IP telephone.

7. A system according to claim 1, wherein, if a request for establishment of a session between the first IP telephone and the second IP telephone is received from the first IP telephone or the first information processing device, the information processing apparatus establishes a session between the first IP telephone and the second IP telephone in accordance with the registration information, thereafter, when the first IP telephone is located near the first information processing device so that the first association identification of the contactless information storage device of the first IP telephone or the first information processing device is detected by the contactless reader/writer device of the first information processing device or the first IP telephone, the first information processing device or the first IP telephone sends, to the information processing apparatus, proximity information which indicates proximity of the first IP telephone to the first information processing device, and in response to receipt of the proximity information, the information processing apparatus establishes a session between the first information processing device and the second information processing device in accordance with the registration information.

8. A system according to claim 1, wherein the system further comprises a third information processing device that comprises at least one of a contactless reader/writer device and a contactless information storage device, if, while the session is established between the first IP telephone and the second IP telephone, the first IP telephone is located near the third information processing device so that the first association identification of the contactless information storage device of the first IP telephone is detected by the contactless reader/writer device of the third information processing device or so the a second association identification of the contactless information storage device of the third information processing device is detected by the contactless reader/writer device of the first IP telephone, then the third information processing device or the first IP telephone sends, to the information processing apparatus proximity information which indicates proximity of the first IP telephone to the third information processing device, and in response to receipt of the proximity information, the information processing apparatus establishes a session between the third information processing device, and the first information processing device and the second information processing device, in accordance with the registration information.

9. A system according to claim 1, wherein the system further comprises a third information processing device that comprises at least one of a contactless reader/writer device and a contactless information storage device, if, while the session is established between the first IP telephone and the second IP telephone, the first IP telephone is located near the third information processing device so that the first association identification of the contactless information storage device of the first IP telephone is detected by the contactless reader/writer device of the third information processing device or so the a second association identification of the contactless information storage device of the third information processing device is detected by the contactless reader/writer device of the first IP telephone, then the third information processing device or the first IP telephone sends, to the information processing apparatus, proximity information which indicates proximity of the first IP telephone to the third information processing device, and in response to receipt of the proximity information, the information processing apparatus sends, in accordance with the registration information, an enquiry whether to permit to establish a session between the third information processing device, and the first information processing device and the second information processing device, to the first information processing device or the first IP telephone, and in response to receipt of the permission from the first information processing device or the IP telephone, the information processing apparatus allows the third information processing device to establish the session.

10. A system according to claim 1, wherein the registration information further includes session statuses of the first and second IP telephones and the first and second information processing devices, proximity information which indicates whether or not the first information processing device is located near the first IP telephone, and proximity information which indicates whether or not the second information processing device is located near the second IP telephone.

11. A system according to claim 1, wherein the first information processing device obtains a piece of the registration information from the information processing apparatus and displays it on a display device of the first information processing device.

12. A system according to claim 1, wherein in response to receipt of the fourth IP address of the second information processing device, the first information processing device activates a P2P communication application.

13. A system comprising:
an information processing apparatus that controls and manage a call between devices;
a first IP telephone that comprises a first contactless information storage device;
a second IP telephone;
a first information processing device that is configured to be operated by an end user and operable independently of an IP telephone, and comprises a first contactless reader/writer device;
a second information processing device that is configured to be operated by an end user and operable independently of an IP telephone; and
a third information processing device that is configured to be operated by an end user and operable independently of an IP telephone, and comprises a second contactless reader/writer device, wherein the first information processing apparatus, the first IP telephone, the first information processing device, the second IP telephone, the second information processing device, and the third information processing device are connectable to an IP network, wherein
the information processing apparatus stores, as registration information, a first telephone identification and a first IP address of the first IP telephone, a first device identification and a second IP address of the first information processing device associated with the first IP telephone by a first association identification that is read by the first contactless reader/writer device from the first contactless information storage device, a second telephone identification and a third IP address of the second IP telephone, a second device identification and a fourth IP address of the second information processing device associated with the second IP telephone, and a third device identification and a fifth IP address of the third information processing device associated with the first IP telephone by the first association identification that is read by the second contactless reader/writer device from the first contactless information storage device, when the first IP telephone is located near the first information processing device and the third information processing device so that the first association identification of the first contactless information storage is detected by the first and second contactless reader/writer device, the first information processing device and the third information processing device send proximity information which indicates proximity to the first IP telephone, to the information processing apparatus, the information processing apparatus stores the proximity information, received from the first information processing device and from the third information processing device, as a part of the registration information, and in response to a request for establishment of a session received from one of the first IP telephone and the first information processing device, the information processing apparatus sends a request for establishment of a session between the first IP telephone and the second IP telephone, to the first IP address and the third IP address stored as the registration information, to establish a session between the first IP telephone and the second IP telephone, and notifies, in accordance with the registration information, one of the second, fourth and fifth IP addresses of corresponding one of the first, second and third information processing devices to the other information processing devices at the IP addresses thereof, to dynamically establish a peer-to-peer session among the first information processing device, the second information processing device, and the third information processing device while the session between the first IP telephone and the second IP telephone is established or continues.

14. A system according to claim 13, wherein the registration information further includes session statuses of the first and second IP telephones and the first and second information processing devices, proximity information which indicates whether or not the first information processing device is located near the first IP telephone, and proximity information which indicates whether or not the second information processing device is located near the second IP telephone.

15. An information processing apparatus that controls and manage a call between devices to allow a session to be established between a first IP telephone and a second telephone over an IP network, and allow a session to be established between a first information processing device and a second information processing device over the IP network, the information processing apparatus comprising:
a storage device that stores, as registration information, a first telephone identification and a first IP address of the first IP telephone, a first device identification and a second IP address of the first information processing device associated with the first IP telephone, a second telephone identification and a third IP address of the second IP telephone, and a second device identification and a fourth IP address of the second information processing device associated with the second IP telephone; and
a session processing unit that sends, in response to a request for establishing a session received from the first IP telephone or the first information processing device, a request for establishing a session between the first IP telephone and the second IP telephone, to the first IP address and the third IP address stored as the registration information, refers to the registration information to determine the first information processing device associated with the first IP telephone and the second information processing device associated with the second IP telephone, obtains the second IP address and the fourth IP address of the determined first and second information processing devices, and notifies one of the obtained second and fourth IP addresses of corresponding one of the first and second information processing devices to the other information processing device at the obtained IP address thereof, to establish a session between the first information processing device and the second information processing device while maintaining the session between the first IP telephone and the second IP telephone.

16. An information processing apparatus that controls and manage a call between devices to allow a session to be established between a first IP telephone and a second telephone over an IP network, and allow a session to be established among a first information processing device, a second information processing device and a third information processing device over the IP network, the information processing apparatus comprising:

a storage device that stores, as registration information, a first telephone identification and a first IP address of the first IP telephone, a first device identification and a second IP address of the first information processing device associated with the first IP telephone, a second telephone identification and a third IP address of the second IP telephone, a second device identification and a fourth IP address of the second information processing device associated with the second IP telephone, and a third device identification and a fifth IP address of the third information processing device associated with the first IP telephone; and a session processing unit that sends, in response to a request for establishing a session received from the first IP telephone or the first information processing device, a request for establishing a session between the first IP telephone and the second IP telephone, to the first IP address and the third IP address stored as the registration information, refers to the registration information to determine the first information processing device associated with the first IP telephone, the second information processing device associated with the second IP telephone and the third information processing device associated with the first IP telephone, obtains the second IP address, the fourth IP address and the fifth IP address of the determined first, second and third information processing devices, and notifies one of the obtained second, fourth and fifth addresses of corresponding one of the first, second and third information processing devices to the other information processing devices at the obtained IP addresses thereof, to establish a session among the first information processing device, the second information processing device, and the third information processing device while maintaining the session between the first IP telephone and the second IP telephone.

17. A non-transitory recording medium storing a program thereon for an information processing apparatus that controls and manage a call between devices and is connectable to an IP network, the program being operable to effect:

storing, as registration information, a first telephone identification and a first IP address of the first IP telephone, a first device identification and a second IP address of the first information processing device associated with the first IP telephone, a second telephone identification and a third IP address of the second IP telephone, and a second device identification and a fourth IP address of the second information processing device associated with the second IP telephone, and in response to a of request for establishment of a session received from the first IP telephone or the first information processing device, sending a request for establishment of a session between the first IP telephone and the second IP telephone, to the first IP address and the third IP address stored as the registration information, referring to the registration information to determine the first information processing device associated with the first IP telephone and the second information processing device associated with the second IP telephone, obtaining the second IP address and the fourth IP address of the determined first and second information processing devices, and notifying one of the obtained second and fourth IP addresses of corresponding one of the first and second information processing devices to the other information processing device at the obtained IP address thereof, to establish a session between the first information processing device and the second information processing device while maintaining the session between the first IP telephone and the second IP telephone.

18. A non-transitory recording medium storing a program thereon for an information processing apparatus that controls and manage a call between devices and is connectable to an IP network, the program being operable to effect:

storing, as registration information, a first telephone identification and a first IP address of a first IP telephone, a first device identification and a second IP address of a first information processing device associated with the first IP telephone, a second telephone identification and a third IP address of a second IP telephone, a second device identification and a fourth IP address of a second information processing device associated with the second IP telephone, and a third device identification and a fifth IP address of a third information processing device associated with the first IP telephone; and in response to a request for establishment of a session received from the first IP telephone or the first information processing device, sending a request for establishment of establish a session between the first IP telephone and the second IP telephone, to the first IP address of the first IP telephone and the third IP address of the second IP telephone stored as the registration information, referring to the registration information to determine the first information processing device associated with the first IP telephone, the second information processing device associated with the second IP telephone and the third information processing device associated with the first IP telephone, obtaining the second IP address, the fourth IP address and the fifth IP address of the determined first, second and third information processing devices, and notifying one of the obtained second, fourth and fifth IP addresses of corresponding one of the first, second and third information processing devices to the other information processing devices at the obtained IP addresses thereof, to establish a session among the first information processing device, the second information processing device, and the third information processing device while maintaining the session between the first IP telephone and the second IP telephone.

19. In an information processing apparatus that controls and manage a call between devices, a method of allowing a session to be established between a first IP telephone and a second telephone over an IP network, and allowing a session to be established between a first information processing device and a second information processing device over the IP network, the method comprising:
  storing, as registration information, a first telephone identification and a first IP address of the first IP telephone, a first device identification and a second IP address of the first information processing device associated with the first IP telephone, a second telephone identification and a third IP address of the second IP telephone, and a second device identification and a fourth IP address of the second information processing device associated with the second IP telephone; and
  in response to a request for establishment of a session received from one of the first IP telephone and the first information processing device, sending a request for establishment of a session between the first IP telephone and the second IP telephone, to the first IP address and the third IP address stored as the registration information, referring to the registration information to determine the first information processing device associated with the first IP telephone and the second information processing device associated with the second IP telephone, obtaining the second IP address and the fourth IP address of the determined first and second information processing devices, and notifying one of the obtained second and fourth IP addresses of corresponding one of the first and second information processing devices to the other information processing device at the obtained IP address thereof, to establish a session between the first information processing device and the second information processing device while maintaining the session between the first IP telephone and the second IP telephone.

20. In an information processing apparatus that controls and manage a call between devices, a method of allowing a session to be established between a first IP telephone and a second telephone over an IP network, and allowing a session to be established among a first information processing device, a second information processing device and a third information processing device over the IP network, the method comprising:
  storing, as registration information, a first telephone identification and a first IP address of the first IP telephone, a first device identification and a second IP address of the first information processing device associated with the first IP telephone, a second telephone identification and a third IP address of the second IP telephone, a second device identification and a fourth IP address of the second information processing device associated with the second IP telephone, and a third device identification and a fifth IP address of the third information processing device associated with the first IP telephone; and
  in response to a request for establishment of a session received from one of the first IP telephone and the first information processing device, sending a request for establishment of a session between the first IP telephone and the second IP telephone, to the first IP address and the third IP address stored as the registration information, referring to the registration information to determine the first information processing device associated with the first IP telephone, the second information processing device associated with the second IP telephone and the third information processing device associated with the first IP telephone, obtaining the second IP address, the fourth IP address and the fifth IP address of the determined first, second and third information processing devices, and notifying one of the obtained second, fourth and fifth IP addresses of corresponding one of the first, second and third information processing devices to the other information processing devices at the obtained IP addresses thereof, to establish a session among the first information processing device, the second information processing device, and the third information processing device while maintaining the session between the first IP telephone and the second IP telephone.

\* \* \* \* \*

UNITED STATES PATENT AND TRADEMARK OFFICE
CERTIFICATE OF CORRECTION

| | |
|---|---|
| PATENT NO. | : 8,724,618 B2 |
| APPLICATION NO. | : 11/504640 |
| DATED | : May 13, 2014 |
| INVENTOR(S) | : Yasushi Hara et al. |

It is certified that error appears in the above-identified patent and that said Letters Patent is hereby corrected as shown below:

Claims

Claim 1, Column 25, Line 2

Delete "apparatus" and insert --apparatus,--, therefor.

Claim 5, Column 25, Line 62

Delete "apparatus," and insert --apparatus--, therefor.

Claim 6, Column 26, Line 3

Delete "apparatus," and insert --apparatus--, therefor.

Claim 8, Column 26, Lines 40-41

Delete "so the" and insert --so that--, therefor.

Claim 8, Column 26, Line 46

Delete "apparatus" and insert --apparatus,--, therefor.

Claim 9, Column 26, Lines 66-67

Delete "so the" and insert --so that--, therefor.

Claim 17, Column 30, Line 10

Delete "a of" and insert --a--, therefor.

Signed and Sealed this
Twenty-fourth Day of November, 2015

Michelle K. Lee
*Director of the United States Patent and Trademark Office*